(12) United States Patent
Sun

(10) Patent No.: US 11,711,181 B2
(45) Date of Patent: *Jul. 25, 2023

(54) TERMINAL AND STORAGE MEDIUM

(71) Applicant: VIVO MOBILE COMMUNICATION CO.,LTD., Guangdong (CN)

(72) Inventor: Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,810

(22) Filed: Nov. 22, 2021

(65) Prior Publication Data

US 2022/0085946 A1 Mar. 17, 2022

Related U.S. Application Data

(63) Continuation of application No. 16/764,801, filed as application No. PCT/CN2018/109722 on Oct. 10, 2018, now Pat. No. 11,228,410.

(30) Foreign Application Priority Data

Nov. 17, 2017 (CN) .......................... 201711149122.7

(51) Int. Cl.
*H04J 11/00* (2006.01)
*H04L 5/00* (2006.01)
(Continued)

(52) U.S. Cl.
CPC ......... *H04L 5/0023* (2013.01); *H04B 7/0456* (2013.01); *H04B 7/0626* (2013.01);
(Continued)

(58) Field of Classification Search
CPC .. H04B 7/2606; H04B 7/2621; H04B 7/0697; H04B 7/15528; H04B 17/309;
(Continued)

(56) References Cited

U.S. PATENT DOCUMENTS 10,659,119 B2 * 5/2020 Li .......................... H04L 5/0048
10,912,112 B2 * 2/2021 Park .................. H04L 25/03343
(Continued)

FOREIGN PATENT DOCUMENTS

| CN | 101547433 A | 9/2009 |
| CN | 103262627 A | 8/2013 |
| CN | 103546888 A | 1/2014 |

OTHER PUBLICATIONS

3GPP TS 38.214 V1.1.1, 3rd Generation Partnership Project; Technical Specification Group Radio Access Network; NR; Physical Layer Procedures for Data (Oct. 2017).
(Continued)

*Primary Examiner* — Eva Y Puente
(74) *Attorney, Agent, or Firm* — Maschoff Brennan

(57) ABSTRACT

A terminal and a storage medium are provided. The storage medium stores a program for causing a processor to implement a method performed by the terminal, the method includes: sending, to a network device, first indication information which is used to indicate, to the network device, at least one of: number of first SRS resource sets required by the terminal, number of first SRS resources in a first SRS resource set, maximum layer number of uplink multi-antenna transmission of the terminal, whether uplink transmission channels of the terminal are coherent, and maximum number of PTRS ports supported for uplink transmission by the terminal, and is used by the network device to determine second indication information used to instruct the terminal to send an SRS signal; receiving second indication information sent by the network device; sending an SRS signal according to second indication information.

20 Claims, 3 Drawing Sheets

(51) Int. Cl.
  *H04B 7/0456* (2017.01)
  *H04B 7/06* (2006.01)
  *H04L 27/26* (2006.01)
  *H04W 72/23* (2023.01)
  *H04J 13/00* (2011.01)

(52) U.S. Cl.
  CPC .......... *H04L 5/0048* (2013.01); *H04L 5/0051* (2013.01); *H04L 27/2613* (2013.01); *H04W 72/23* (2023.01); *H04J 13/0062* (2013.01)

(58) Field of Classification Search
  CPC ............... H04B 7/0621; H04B 7/0636; H04W 72/0413; H04W 52/18; H04W 72/0473; H04W 52/146; H04W 52/383; H04W 76/14; H04W 72/1284; H04L 5/0053; H04L 5/0055; H04L 5/0094; H04L 1/1812; H04L 5/001; H04L 5/0051; H04L 1/1671; H04L 1/00; H04L 1/0009; H04J 11/004; H04J 11/00
  USPC ........................................................ 370/329
  See application file for complete search history.

(56) References Cited

U.S. PATENT DOCUMENTS 11,228,410 B2 *  1/2022  Sun ..................... H04L 5/0048
2011/0292823 A1  12/2011  Barbieri et al.

OTHER PUBLICATIONS

CATT, Discussion on non-codebook based transmission for UL, R1-1715795, 3GPP TSG RAN WG1 Meeting NR#3, Nagoya, Japan, Sep. 18-21, 2017.
ZTE, Sanechips, Details of UL Beam Management, R1-1717430, 3GPP TSG RAN WG1 Meeting 90bis, Prague, CZ, Oct. 9-13, 2017.
CATT, Further discussion on codebook based transmission for UL, R1-1717807, 3GPP TSG RAN WG1 Meeting 90bis, Prague CZ, Oct. 9-13, 2017.
Intel et al., Joint WF on PTRS, Density Tables for CP-OFDM, R1-1718998, Oct. 12, 2017.
European Search Report issued in corresponding application No. 18879120.6, dated Nov. 11, 2020.
International Search Report and Written Opinion issued in corresponding application No. PCT/CN2018/109722, dated Jan. 2, 2019.

* cited by examiner

TERMINAL AND STORAGE MEDIUM

CROSS-REFERENCE TO RELATED APPLICATION

This application is a continuation of U.S. patent application Ser. No. 16/764,801, which is the U.S. national phase of PCT Application No. PCT/CN2018/109722 filed on Oct. 10, 2018, which claims priority to a Chinese Patent Application No. 201711149122.7 entitled "SIGNAL TRANSMISSION METHOD, TERMINAL, AND NETWORK DEVICE" filed before SIPO on Nov. 17, 2017, the disclosures of which are incorporated in their entirety by reference herein.

TECHNICAL FIELD

The present disclosure relates to the field of radio communication technology, in particular relates to a terminal, and a storage medium.

BACKGROUND

In a Fifth-Generation (New Radio (NR)) system, there may be an implementation in which multiple terminals exist simultaneously due to complexity of a NR application scenario. However, in the related art, when a terminal reports capability information of the terminal per se, there are a plurality of redundant terminal capabilities and structures, so that a signaling overhead is over large.

SUMMARY

Some embodiments of the present disclosure provide a signal transmission method, a terminal, and a network device, so as to realizing efficient transmission of an SRS signal.

In order to achieve that above objectives, some embodiments of the application adopt follow technical solutions.

In a first aspect, a signal transmission method is provided. The method includes: sending, by a terminal, first indication information to a network device; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal; receiving, by the terminal, the second indication information sent by the network device; sending the SRS signal by the terminal according to the second indication information.

In a second aspect, a signal transmission method is provided. The method includes: receiving, by a network device, first indication information sent by a terminal; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal; determining the second indication information by the network device according to the first indication information; sending the second indication information to the terminal by the network device; receiving, by the network device, the SRS signal sent by the terminal.

In a third aspect, a terminal is provided. The terminal includes: a sending module, used to send first indication information to a network device; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal; and a receiving module, used to receive the second indication information sent by the network device; wherein the sending module is further used to send the SRS signal according to the second indication information.

In a fourth aspect, a network device is provided. The network device includes: a receiving module, used to receive first indication information sent by a terminal; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal; a determining module, used to determine the second indication information according to the first indication information; a sending module, used to send the second indication information to the terminal; wherein the receiving module is further used to receive the SRS signal sent by the terminal.

In a fifth aspect, a terminal is provided. The terminal includes a processor, a storage, and a computer program stored on the storage and executable by the processor, wherein when the computer program is executed by the processor, the processor implements the steps of the signal transmission method according to the first aspect.

In a sixth aspect, a network device is provided. The network device includes a processor, a storage, and a computer program stored on the storage and executable by the processor, wherein when the computer program is executed by the processor, the processor implements the steps of the signal transmission method according to the second aspect.

In a seventh aspect, a compute readable storage medium is provided. A computer program is stored on the computer readable storage medium. The steps of the signal transmission method according to the first aspect or the steps of the signal transmission method according to the second aspect are implemented when the computer program is executed by a processor.

In the embodiments of the present disclosure, the terminal sends first indication information to a network device, wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal; the terminal receives the second indication information sent by the network device; and the terminal sends the SRS signal according to the second indication information.

DETAILED DESCRIPTION

Figure 1:
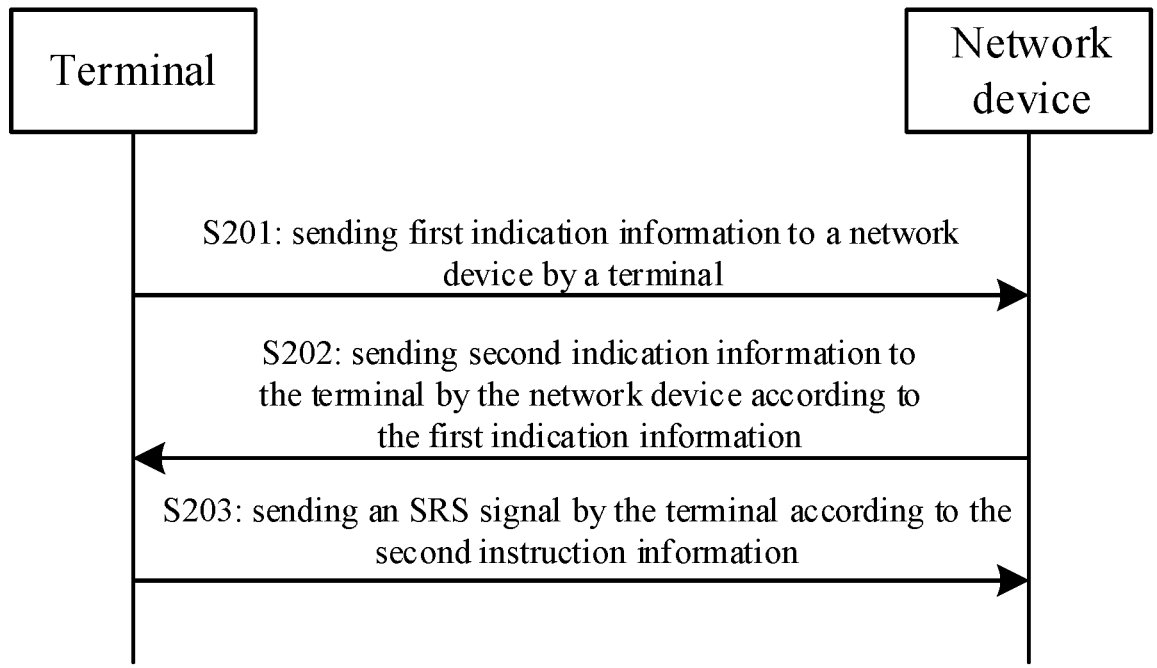
FIG. 1 is a first flowchart of a signal transmission method according to some embodiments of the present disclosure.

Technical solutions in some embodiments of the present disclosure will be clearly and completely described hereinafter in conjunction with accompanying drawings in some embodiments of the present disclosure, and it is obvious that the described embodiments are a part, rather than all, of the embodiments of the present disclosure. Based on the embodiments of the present disclosure, all other embodiments obtained by those of ordinary skill in the art without paying creative labor are within the protection scope of the present disclosure.

The technical solutions provided by the present disclosure can be applied to various communication systems, for example, Fifth-Generation (5G) communication systems, future evolutional systems or various communication-fusion systems, and the like. Various application scenarios may be included, such as machine to machine (M2M), D2M, macro-micro communication, enhance Mobile Broadband (eMBB), ultra reliable & low latency communication (URLLC) and massive machine type communication (mMTC) and the like. These scenarios include, but are not limited to, communication between a terminal and a terminal, communication between a network device and a network device, communication between a network device and a terminal, and the like. The embodiments of the present disclosure may be applied to the communication between a network device and a terminal, or the communication between a terminal and a terminal, or the communication between a network device and a network device in a 5G communication system.

A communication system involved in the embodiments of the present disclosure includes at least one network device and one or more terminals to which each of the at least one network device is connected.

The network device may be a base station, a core network device, a Transmission Reference Point (TRP), a relay station, an access point, or the like. The network device may be a Base Transceiver Station (BTS) in Global system for Mobile communication (GSM) or a Code Division Multiple Access (CDMA) network, or may be an NB (Node B) in a Wideband Code Division Multiple Access (WCDMA) system, or may be an eNB or an eNodeB (evolutional Node B) in a Long Term Evolution (LTE) system. The network device may also be a radio controller in a context of a cloud radio access network (CRAN). The network device may also be a network device in the 5G communication system or a network device in the future evolutional network.

The terminal may be a wireless terminal or a wired terminal. The wireless terminal may be a device providing voice and/or other service data connectivity to a user, a handheld device having a wireless communication function, a computing device or other processing devices connected to a wireless modem, an in-vehicle device, a wearable device, a terminal in a future 5G network or a terminal in a future evolved PLMN network, or the like. The wireless terminal may communicate with one or more core networks via a Radio Access Network (RAN), and the wireless terminal may be a mobile terminal, such as a mobile telephone (or referred to as a "cellular" phone) and a computer having a mobile terminal, for example, may be a portable mobile device, a pocket-sized mobile device, a handheld mobile device, a computer-built-in mobile device or an on-board mobile device that exchanges language and/or data with a radio access network, and devices such as a Personal Communication Service (PCS) telephone, a cordless telephone, a Session Initiation Protocol (SIP) telephone, a Wireless Local Loop (WLL) station, and a Personal Digital Assistant (PDA); the wireless terminal may be a mobile device or a User Equipment (UE), a terminal, an access terminal, a wireless communication device, a terminal unit, a terminal station, a Mobile Station, a Mobile, a Remote Station, a remote station, a Remote Terminal, a Subscriber Unit, a Subscriber Station, a User Agent, a terminal device, and the like. The above are merely examples and are not limited to those in practical applications.

Some of terms involved in the present disclosure are explained below to facilitate understanding of a reader.

1. Regarding Beam Measurement and Beam Reporting

Analog beamforming is full-band transmission, and an array element in each polarization direction on a panel of each high-frequency antenna array can only transmit an analog beam in a time-division-multiplexing manner. A shaping weight of the analog beam is realized by adjusting parameters of an RF front-end phase shifter and other devices. Currently, in academia and industry, training of analog beamforming vectors is usually carried out using a polling method. That is, array elements in various polarization directions on each antenna panel of the terminal sequentially transmit training signals (i.e., candidate shaping vectors) at a predefined time in a time-division-multiplexing manner, the training signals are used by a network side or a terminal side to indicate in next beam training or service transmission.

2. Regarding Downlink Beam Indication

Based on the beam measurement and beam reporting, the network side selects a corresponding beam for signal transmission while indicating information of the corresponding beam to the terminal, and the terminal performs signal reception depending on beam indication. At present, it has been specified that the beam indication is dynamic indication in a physical layer control channel.

3. Regarding Uplink Beam Indication (SRI or CRI)

The uplink beam indication refers to an indication, by the network side, of an uplink beam used by the terminal. This indication needs to be used in both uplink beam training and an uplink transmission procedure. An uplink beam training procedure currently discussed includes U1, U2, and U3. U1 represents preliminary training of an UL transmission beam and an UL reception beam, U2 represents fine training of the UL transmission beam, and U3 represents fine training of the UL reception beam.

In processes of U2 and U3, the network side notifies, using known information, the terminal to transmit the correspond beam. For example, through the U1 process, the network side has preliminarily known which panel at the terminal side corresponds to better uplink transmission. In the U2 process, the SRI instructs the terminal to transmit different beams on corresponding panels to perform finer training of a transmission beam; in the U3 process, the SRI may also be used to instruct the terminal to transmit a plurality of beams on these panels to facilitate a receiving end to perform training of a reception beam.

In a case that there is symmetry in a network, CRI information may be used to implicitly indicate corresponding uplink beam information.

4. Regarding Uplink Transmission Mode

Current uplink transmission modes are divided into two types, one type is a mode of codebook based transmission, one type is a mode of non-codebook based transmission. In a case of the codebook based transmission, the network instructs a corresponding codeword to the terminal according to a predetermined codebook, and the terminal performs multi-antenna precoding according to the instruction of the network and performs uplink transmission. In case of non-codebook based transmission, the network indicates a correspond SRS index (SRI) to the terminal, the terminal determines precoding corresponding to actual data transmission according to precoding used by the SRS.

5. Other Terms

Such term as "and/or" herein is merely a term for describing an association relation of associated objects, and may indicate that there are three relations, for example "A and/or B" may mean that A exists alone, A and B exist simultaneously, and B exists alone. In addition, such character as "/" herein generally indicate that associated objects before and after "/" have a "or" relation therebetween; in a formula, the character "/" indicates that the associated objects before and after "/" have a "divide" relation. If not stated, such term as "multiple" or "a plurality of" herein refers to two or more.

In order to facilitate clear description of the technical solutions of embodiments of the present disclosure, in the embodiments of the present disclosure, such words as "first", "second" and the like are used to distinguish same or similar items having substantially the same function or effect, and those skilled in the art may understand that such words as "first", "second" and the like do not limit the number and an execution order.

It should be noted that in the embodiments of the present disclosure, such words as "exemplary" or "for example" or "e.g." are used to represent examples, cases, or illustrations. Any embodiment or design described as "exemplary" or "e.g." in the embodiments of the present disclosure should not be construed as being more preferred or advantageous than other embodiments or designs. To be precise, usage of words such as "exemplary" or "e.g." is intended to present relevant concepts in a specific manner.

First Embodiment

FIG. 1 shows a flowchart of a signal transmission method provided by the present disclosure. In particular, that method includes steps S201-S203.

S201: sending first indication information to a network device by a terminal.

The first indication information is used to indicate capability information of the terminal to the network device, and specifically indicates at least one of following: the number of first SRS resource sets required by the terminal, the number of first SRS resources in each of the first SRS resource sets, the maximum number of layers of uplink multi-antenna transmission of the terminal, whether uplink transmission channels of the terminal are coherent, the maximum number of PTRS (Phase Tracking Reference Signal) ports; the first indication information is used by the network device to determine second indication information, the second indication information is used to instruct the terminal to send a Sounding Reference Signal (SRS) signal.

Whether the uplink transmission channels of the terminal are coherent includes following three types: a first type in which the uplink transmission channels of the terminal are fully-coherent, that is, RF channels of the terminal are fully-coherent, a second type in which the uplink transmission channels of the terminal are non-coherent, that is, RF channels of the terminal are non-coherent, and a third type in which the uplink transmission channels of the terminal are partially-coherent, that is, a part of the RF channels of the terminal is coherent, for example, RF channel 1 and RF channel 3 are coherent, and RF channel 2 and RF channel 4 are coherent. For the type of partial coherence, which ports are coherent may be determined according to pre-specified rules.

S202: sending second indication information to the terminal by the network device according to the first indication information.

S203: sending an SRS signal by the terminal according to the second instruction information.

For example, when the terminal sends, to the network device, capability information of the terminal indicated in the first indication information, the capability information of the terminal may be directly explicitly indicated, that is, specific capability information of the terminal is included in the first indication information and sent to the network device, or may be implicitly indicated, that is, other capability information may be implicitly indicated based on at least one of the above-described five types of capability information.

1) For the number of first SRS resource sets, the first indication information may directly include the number of the first SRS resource sets, or the number of the first SRS resource sets may be implicitly indicated through other capability information of the terminal, for example, the number of SRS resource sets required by the terminal corresponds to the number of antenna panels of the terminal in a one-to-one manner, for example, when the number of antenna panels of the terminal is 2, the number of SRS resource sets is 2.

2) For the number of first SRS resources in the first SRS resource set: the first indication information may directly include the number of the first SRS resources in the first SRS resource set, or the number of the first SRS resources in the first SRS resource set may be implicitly indicated by other capability information of the terminal, specifically, how to indicate may be performed according to the following examples 1-2.

Example 1: the first indication information is specifically used to indicate the number of analog beams required by an antenna panel of the terminal, the number of analog beams is used to indicate the number of first SRS resources, generally, the number of sources in each resource set is the same as the number of analog beams required by each antenna panel.

Specifically, when information of the number of analog beams required by the terminal has a hierarchical structure, the first indication information is specifically used to indicate the number of analog beams required by an antenna panel of the terminal, and the first indication information includes at least one of: the total number of analog beams in all analog beam layers of the antenna panel, the number of analog beams required by each analog beam layer of the antenna panel, and the number of analog beams in a first analog beam layer of the antenna panel. The first analog beam layer is an analog beam layer having the largest number of analog beams in all analog beam layers of the antenna panel. For example, when the terminal determines the number of analog beams required by an antenna panel, the terminal may make a report according to an analog-beam level relation of the terminal per se; if a beam level of an antenna of the terminal includes two layers, i.e. a first level including a beam 0 and a beam 5 and a second level including beams 1 to 4 and 6 to 9, and when the terminal makes a report actually, whether to report the total number of beams required by all levels (e.g. 5 beams per panel) or the number of beams required by a level having the maximum number of beams (e.g. 4 beams per panel), or the number of beams required by each level (the number of beams required by the first level is 1, and the number of beams required by the second level is 4) may be determined in advance through standardization (e.g. a protocol).

Example 2: the first indication information is specifically used to indicate the number of first SRS resources, and the number of first SRS resources is used to indicate the number of analog beams.

3) For the maximum number of layers for uplink multi-antenna transmission of the terminal or the number of layers for each antenna panel, the maximum number of layers of uplink multi-antenna transmission of the terminal is used to represent the total number of uplink data channels of the terminal, and the number of layers of each antenna panel is used to represent the number of each antenna panel. The terminal may directly report the maximum number of layers through the first indication information, thereby implicitly reporting the total number of uplink data channels of the terminal to the network device, and directly report the number of layers of each antenna panel through the first indication information, thereby implicitly reporting the number of each antenna panel. Optionally, the terminal can directly report the total number of uplink data channels of the terminal through the first indication information, thereby implicitly reporting the maximum number of layers to the network device, and directly report the number of each antenna panel through the first indication information, thereby implicitly reporting the number of layers of each antenna panel.

If the terminal reports the number of each antenna panel, the number of first SRS resources may be obtained by multiplying the number of each antenna panel by the number of first SRS resources reported.

Further, the maximum number of layers of the uplink multi-antenna transmission of the terminal or the number of layers of each antenna panel can also be implicitly obtained through other capability information of the terminal according to a predetermined rule.

4) For phase information among uplink transmission channels of the terminal, the first indication information may directly include phase information among the uplink transmission channels of the terminal, or phase information among the uplink transmission channels of the terminal may be implicitly indicated through other capability information of the terminal, specifically, how to indicate may be performed according to the following examples.

Example 1: the first indication information is used to indicate that uplink transmission channels of the terminal are fully-coherent, wherein the first indication information is that the number of first SRS resource sets is 1 and the maximum number of layers is greater than 1; or, Example 2: the first indication information is used to indicate that uplink transmission channels of the terminal are non-coherent, and the first indication information is that the number of the first SRS resource sets is the same as the maximum number of layers; or, Example 3: the first indication information is used to indicate the uplink transmission channels of the terminal are partially-coherent, and the first indication information is that the number of the first SRS resource sets is greater than 1 and the maximum number of layers is greater than 1.

Optionally, coherence information among the uplink transmission channels is used to indicate the maximum number of PTRS ports; or, the maximum number of layers and the number of first SRS resource sets are used to indicate the maximum number of PTRS ports; or, the maximum number of PTRS ports is used to indicate whether the uplink transmission channels are coherent; or, the maximum number of PTRS ports and the number of layers are used to indicate whether the uplink transmission channels are coherent.

In an example, the first indication information may explicitly display the maximum number of PTRS ports and implicitly indicate the coherence information among uplink transmission channels based on the maximum number of PTRS ports, specifically how to indicate may be performed according to following example 1-2.

Example 1: coherence information among uplink transmission channels is used to indicate the maximum number of PTRS ports described above; the first indication information is used to indicate that uplink transmission channels of the terminal are fully-coherent, the first indication information is that the maximum number of PTRS ports is 1; or, the first indication information is used to indicate that uplink transmission channels of the terminal are non-coherent, and the first indication information is that the maximum number of PTRS ports is the same as the maximum number of layers; or, the first indication information is used to indicate the uplink transmission channels of the terminal are partially-coherent, and the first indication information is that the maximum number of PTRS ports is the number of the first SRS resource sets.

Example 2: the maximum number of layers and the number of first SRS resource sets are used to indicate the maximum number of PTRS ports; the first indication information is used to indicate that the number of the first SRS resource sets is 1 and the maximum number of layers is greater than 1, and the first indication information is that the maximum number of PTRS ports is 1; or, the first indication information is used to indicate that the number of the first SRS resource sets is the same as the maximum number of layers, and the first indication information is that the maximum number of PTRS ports is the same as the maximum number of layers; or, the first indication information is used to indicate that the number of the first SRS resource sets is greater than 1 and the maximum number of layers is greater than 1 and the maximum number of PTRS ports, and the first indication information is that the maximum number of PTRS ports is the number of the first SRS resource sets.

Example 3: the maximum number of PTRS ports is used to indicate whether the uplink transmission channels are coherent; the first indication information is used to indicate uplink transmission channels of the terminal are fully-coherent, and the first indication information is that the maximum number of PTRS ports is 1.

Example 4: the maximum number of PTRS ports is used to indicate whether the uplink transmission channels are coherent; the first indication information is used to indicate that uplink transmission channels of the terminal are non-coherent, and the first indication information is that the maximum number of PTRS ports is the same as the maximum number of layers, and, the maximum number of PTRS ports is great than 1; or, the first indication information is used to indicate the uplink transmission channels of the terminal are partially-coherent, the first indication information is that the maximum number of PTRS ports is greater than 1, and, the maximum number of PTRS ports is less than the maximum number of layers.

Optionally, the second indication information is used to instruct the terminal to send the SRS signal according to a first predetermined rule.

The first predetermined rule includes: sending the SRS signal using a second SRS resource configured by the network device, performing at least one of beam repetition and beam-scanning using an analog beam in the highest analog beam layer of the antenna panel, performing beam-training or beam-scanning on all beams, performing beam-scanning according to an analog beam in the lowest analog beam layer of the antenna panel, calculating a transmission power according to a granularity of a second SRS resource set, sending the SRS signal simultaneously on each second SRS resource in each second SRS resource set, and performing precoding on the SRS signal according to a precoding granularity indicated by the network device.

Further optionally, if the second indication information is further used to indicate at least one second SRS resource set, then the first predetermined rule is to perform beam-repetition using an analog beam in the highest analog beam layer of the antenna panel, wherein each second SRS resource set indicated by the second indication information includes a second SRS resource; the first predetermined rule is to perform beam-training or beam-scanning on all beams or perform beam-repetition using an analog beam in the highest analog beam layer of the antenna panel, or perform beam-scanning using an analog beam in the highest analog beam layer of the antenna panel, wherein the second indication information indicates at least one second SRS resource set, and the number of second SRS resources indicated by the second indication information is the same as the number of the first SRS resources.

Illustratively, the network device configures the second SRS resources for the terminal according to an indication of the first indication information, and the terminal sends the SRS signal according to configured information and a predetermined or standardized rule.

Example 1: the second SRS resource configured for the terminal by the network device is divided into two types, one type is a resource for beam management, the other type is a resource for acquiring channel state information, and when the network device configures the two types of second SRS resources for the terminal, usage of corresponding resources may be indicated directly.

Example 2: when the network device configures, for the terminal, the second SRS resource for beam management, 1) the network device performs resource configuration according to the number of first SRS resource sets and the number of first SRS resources within each first SRS resource set indicated by the first indication information; 2) the network device may configure a first SRS resource for each first SRS resource set, and in such as case, the terminal assumes that beam training is performed using the highest-level beam; 3) if the network device performs configuration according to the maximum number of resources in each first SRS resource set indicated by the first indication information, and if the network device has no other indication indicating a beam scanning behavior of the terminal, then the terminal performs beam training on all beams; 4) if the network device performs configuration according to the maximum number of resources in each first SRS resource set reported by the terminal, and if the network device indicates beam repetition, but does not indicate a corresponding transmission beam, then the terminal performs beam repetition according to the highest-level beam; 5) if the network device performs configuration according to the maximum number of resources in the first SRS resource set reported by the terminal, and if the network device indicates beam scanning, but does not indicate a corresponding transmission beam, the terminal performs beam scanning on all transmission beams, or performs beam scanning on the lowest-level beam; 6) the network device may also perform resource configuration according to a hierarchical beam information reported by the terminal, that is, when the first indication information is used to indicate the hierarchical beam information, the network device may perform resource configuration according to the hierarchical beam information.

Exemplarily, the network device may instruct the terminal of precoding granularity when the network device configures the SRS, and the terminal performs corresponding precoding on the SRS signal according to the indicated granularity; if the network device does not indicate or no standardization or no technical specification is provided, then the terminal needs to assume that the network will perform channel estimation according to continuously allocated bandwidth.

Optionally, if the second indication information is used to instruct the terminal to identify the second SRS resource according to a first predetermined rule, then the first predetermined rule includes: identifying the second SRS resource as an SRS resource for acquiring channel information for an uplink transmission channel in the codebook based transmission, identifying the second SRS resource as an SRS resource for acquiring channel information for an uplink transmission channel in non-codebook based transmission.

Further optionally, when the second indication information is used to indicate that the number of ports of the second SRS resource is greater than 1, the first predetermined rule is to identify the second SRS resource as the SRS resource for acquiring channel information of an uplink transmission channel in the codebook based transmission. When the second indication information is used to indicate that the number of ports of the second SRS resource is 1, the first predetermined rule is to identify the second SRS resource as an SRS resource for acquiring channel information of an uplink transmission channel in the non-codebook based transmission.

Further optionally, when the second indication information is used to indicate that the number of ports of the second SRS resource is greater than 1, the first predetermined rule is to identify the second SRS resource as an SRS resource for acquiring channel information of an uplink transmission channel in the codebook based transmission; the second indication information is further used to indicate beam information of different ports in the second SRS resource, the number of different beams indicated for all ports of a second SRS resource is the same as the number of the first SRS resource sets, the first indication information is used to indicate the number of the first SRS resource sets; or, the second indication information is further used to indicate different pieces of beam information of various ports in the second SRS resource, the number of beams indicated for all ports of a second SRS resource is determined by information, in the first indication information, indicating whether the uplink transmission channels of the terminal are coherent; or, the second indication information is used to instruct the terminal to select, according to a predetermined port-numbering rule, ports of different antennas to send the SRS signal.

Illustratively, if the number of ports of a single second SRS resource in the second SRS resource set is greater than 1, then the terminal considers that the second SRS resource in the second SRS resource set is used for acquiring channel information of an uplink transmission channel in the codebook based transmission.

Example 1: the second SRS resource set is defined by a protocol to have only one second SRS resource, and the number of ports of the second SRS resource is the same as the maximum number of layers.

Example 2: in respect of the number of beams of different ports of the same second SRS resource within the second SRS resource set, different ports are allowed to use different beams, different beams may be indicated for different ports of the same second SRS resource by a plurality of SRIs. For example, the number of beams indicated by the network device to the terminal is the same as the number of second SRS resource sets indicated by the first indication information; or, when the number of second SRS resource sets reported by the terminal is smaller than the maximum number of layers reported by the terminal, a relation between an indicated beam and a corresponding second SRS resource port may be specified in advance.

Example 3: the number of beams indicated by the network device to the terminal may also be determined by information, reported by the terminal, about whether uplink transmission channels are coherent.

Illustratively, if the second indication information is also used to indicate the number of beams, the first indication information is used to indicate whether uplink transmission channels of the terminal are coherent; the first indication information is used to indicate that uplink transmission channels of the terminal are non-coherent, and the second indication information is specifically used to indicate that the number of beams is 1 to indicate one beam for each port; or, the first indication information is used to indicate phases of uplink transmission channels of the terminal are partially coherent, and the second indication information is specifically used to indicate a beam for each port pair; or, the first indication information is used to indicate phases of uplink transmission channels of the terminal are partially coherent, and the second indication information is specifically used to indicate a beam for each port pair; the above port pair is pre-specified.

Illustratively, when a terminal performs uplink SRS transmission, SRS signals of different antennas need to be arranged according to a port-numbering rule previously specified. In case of partial coherence, for example, it may be specified in advance that a port 1 and a port 3 are coherent, a port 2 and a port 4 are coherent, and when an SRS is to be sent, the terminal needs, according to this specification, to combine coherent antennas to send the SRS.

Optionally, the second indication information is used to indicate that the number of ports of the second SRS resource is 1, the first predetermined rule is to identify the second SRS resource as an SRS resource for acquiring channel information of an uplink transmission channel in a non-codebook based transmission mode; the second indication information is specifically used to indicate at least one second SRS resource set and a CSI-RS corresponding to each second SRS resource set, and the CSI-RS is specifically used to instruct the terminal to calculate a precoding vector for an SRS resource within the corresponding second SRS resource set, or the second indication information is specifically used to indicate a transmission beam corresponding to each second SRS resource, or, the SRS signal includes at least two first SRS signals, and the second indication information is used to indicate that the terminal sorts the at least two first SRS signals prior to sending the at least two first SRS signals subjected to precoding.

Further optionally, the second SRS resources are precoded among the antennas that are coherent, or the second SRS resources are precoded among at least two antennas that are non-coherent.

Further optionally, a rule of the sorting is a predefined rule, or a rule configured by the network device which includes sorting according to a condition of whether phases of ports are coherent.

Illustratively, if each second SRS resource within the second SRS resource set has only one port, the terminal considers the second SRS resource set to be used as a non-codebook based transmission.

Example 1: the network device may uniformly configure or dynamically indicate, for the second SRS resource set, a CSI-RS for acquiring channel information and calculating a precoding vector (e.g., a precoding weight) when the terminal sends an SRS in the second SRS resource set.

Example 2: the network device may configure or dynamically indicate a transmission beam for each second SRS resource within the second SRS resource set. respectively.

Example 3: when the terminal performs precoding on an SRS signal, the precoding is only performed among antennas that are coherent, and the precoding is not performed within a resource among two antennas that are non-coherent.

Example 4: when the terminal performs uplink transmission on the precoded SRS signal, the terminal sorts SRS transmission according to coherence information among uplink transmission channels reported previously and the maximum number of layers. For example, if the coherence information is the 'fully coherent' or the 'non-coherent', no particular specification is provided; if the coherent information is the 'partial coherent', then the SRS transmission is sorted in a predefined order, for example, coherent ports are sorted first and then phase-incoherent ports are sorted. For example, if the maximum number of layers is 4 and the coherence information is the 'partial coherent', then in SRSs transmitted by the terminal, SRSs corresponding to SRI=1 and SRI=2 are specified to be sent from the same group of coherent port pairs, and SRSs corresponding to SRI=3 and SRI=4 are specified to be sent from another group of coherent port pairs.

Second Embodiment

Figure 2:
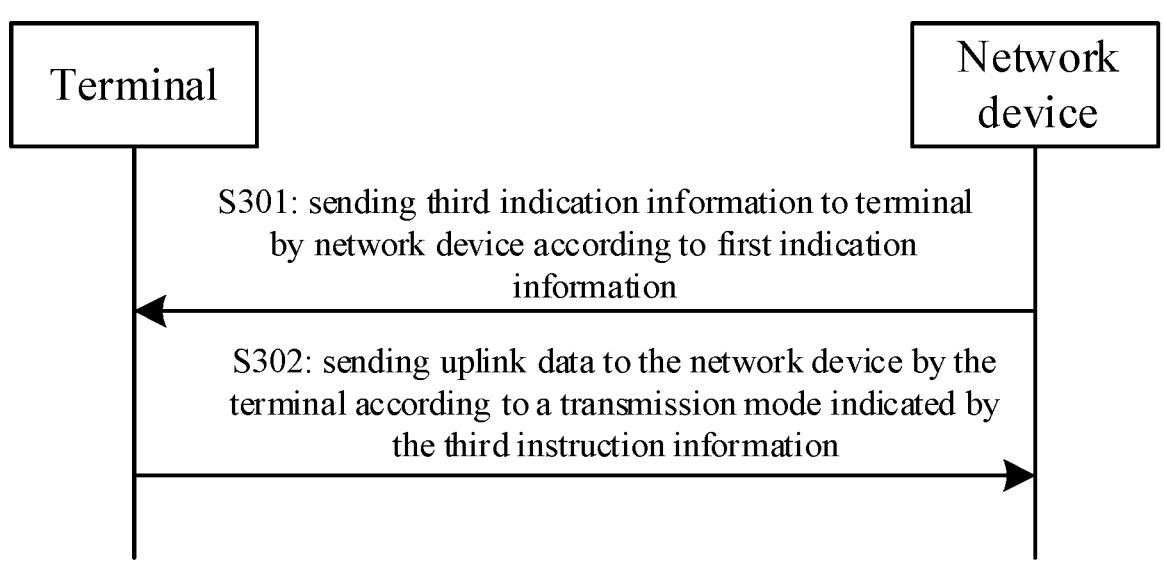
FIG. 2 is a second flowchart of a signal transmission method according to some embodiments of the present disclosure.

On basis of the first embodiment, if the first indication information is also used to indicate the network device to determine third indication information, FIG. 2 shows another flow diagram of a signal transmission method provided by the present disclosure. In particular, that method includes S301-S302.

S301: sending third indication information to a terminal by the network device according to the first indication information.

The third indication information is used to instruct a transmission mode of uplink data transmitted by the terminal to the network device, the transmission mode includes codebook based transmission and non-codebook based transmission, and the first indication information is also used by the network device to determine the third indication information.

S302: sending uplink data to the network device by the terminal according to the transmission mode indicated by the third instruction information.

Optionally, the third indication information is used to indicate a second SRS resource. The second SRS resource includes a resource for acquiring channel state information in codebook based transmission, and the transmission mode of the uplink data is codebook based transmission; or, the second SRS resource includes a resource for acquiring channel state information in non-codebook based transmission, and the transmission mode of the uplink data is the non-codebook based transmission; or, the second SRS resource does not include the resource for acquiring channel state information of a codebook transmission channel or the resource for acquiring channel state information of a non-codebook transmission channel, then the transmission mode of the uplink data is the non-codebook based transmission; or, the second SRS resource does not include the resource for acquiring channel state information of the codebook transmission channel or the resource for acquiring channel state information of the non-codebook transmission channel, then, the transmission mode of the uplink data is the codebook based transmission; or, the third indication information directly indicates whether the transmission mode of the uplink data is the codebook based transmission or the non-codebook based transmission.

Further optionally, the second SRS resource is indicated by an identifier (ID) of the second SRS resource set and an index of a resource in the resource set.

Illustratively, the network device may also notify the terminal of a corresponding transmission behavior in an implicit manner.

Example 1: if the second SRS resource indicated by the network device includes an SRS for acquiring a CSI of codebook based transmission, data transmission corresponding to the second SRS resource is codebook based transmission.

Example 2: the second SRS resource indicated by the network device to the terminal may be the SRI, i.e., the SRS Resource Index, or may be an ID of the SRS resource set.

Example 3: if the second SRS resource indicated by the network device includes an SRS resource for acquiring a CSI of non-codebook based transmission, corresponding data transmission is non-codebook based transmission.

Example 4: the second SRS resource indicated by the network device to the terminal may be the SRS Resource Index, i.e., SRI, or the ID of the SRS resource set, or the ID of an SRS resource set may be indicated first, and then the SRI within the SRS resource set is indicated.

Example 5: if the second SRS resource indicated by the network device neither includes the SRS resource for acquiring a CSI of codebook based transmission, nor includes the SRS resource for acquiring a CSI of non-codebook based transmission, corresponding data transmission is considered to be the non-codebook based transmission; in such a case, the SRI mainly indicates an SRS for beam management.

Optionally, when the third indication information or the second SRS resource indicates the non-codebook based transmission, the terminal adopts the same transmission beam and transmission precoding mode as that for the second SRS resource.

Optionally, when the third indication information or the second SRS resource indicates the codebook based transmission, the terminal employs the same transmission beam as that for the second SRS resource.

Optionally, the third indication information is used to indicate an association relation between a PTRS port and a DMRS port of the terminal; wherein the association relation is used to indicate the transmission mode.

Optionally, the transmission mode is the codebook based transmission, and the third indication information is further used to indicate coding matrix information (Transmission Precoding Matrix Indicator (TPMI)) of the terminal and the maximum number of layers. The terminal may determine, through information of the SRI or the SRS set indicated by the network device, a beam to be used.

Illustratively, if the network device indicates the non-codebook based transmission, the terminal may simultaneously obtain, through the SRI, uplink beam information and uplink precoding weight information (same as the SRI or SRI set being indicated), the association relation between the SRI and the DMRS port indicated by the network device is determined according to a one-to-one mapping rule specified in advance.

Optionally, the method further includes S303.

S303: receiving, by the terminal, the fourth indication information sent by the network device.

Optionally, the fourth indication information is used to instruct the terminal to use one PTRS port; if the maximum number of PTRS ports indicated by the first indication information is 1 or the fourth indication information is used to instruct the terminal to use one PTRS port, and the maximum number of layers is less than or equal to 4, then the PTRS port is associated with a predefined DMRS port; or, if the maximum number of PTRS ports indicated by the first indication information is 1 or the fourth indication information is used to instruct the terminal to use one PTRS port, and the maximum number of layers is greater than 4, then the third indication information is used to indicate that the PTRS port is associated with a predefined DMRS port.

Illustratively, when the terminal has only one PTRS port or the network configures the terminal to use only one PTRS port s, when the maximum number of layers is less than or equal to 4 (<=4), the PTRS port is associated with a DMRS port numbered the lowest/highest value or a DMRS port determined according to another rule (i.e., the same precoding is used); when the maximum number of layers is larger than 4 (>4), the PTRS port is associated with the DMRS port with a lowest numbering value in layers with a lower CQI (i.e. the same precoding is used), or still associated with a DMRS port numbered the lowest/highest value or a DMRS port determined according to another rule, among all DMRS ports; when channels of the terminal are non-coherent and the number of PTRS ports reported based on the capability of the terminal is more than one, each DMRS port is associated with one PTRS port (i.e., the same precoding is used); the one-to-one mapping rule can be specified in advance, and in such a case, the maximum number of layers allowed for the terminal can be further defined to be the same as the number of PTRS ports.

Optionally, the fourth indication information is used to indicate that the terminal uses two PTRS ports. If the maximum number of PTRS ports is 2 or the fourth indication information is used to instruct that the terminal uses two PTRS ports, and data transmission ports corresponding to the TPMI are in one of two groups of data transmission ports specified in advance, then the number of PTRS ports available for the DMRS port is equal to 1, and the PTRS port is associated with the DMRS port; or, if the maximum number of PTRS ports is 2 or the fourth indication information is used to indicate that the terminal uses two PTRS ports, the data transmission port corresponding to the TPMI is not in one of two groups of data transmission ports specified in advance, then the number of PTRS ports available for the DMRS port is greater than 1, and the first DMRS port corresponding to each group of data transmission ports is associated with one PTRS port.

Further optionally, a grouping rule for grouping the two groups of data transmission ports specified in advance is obtained according to a codebook; or, the grouping rule for grouping the two groups of data transmission ports specified in advance is obtained according to coherence information, reported by the terminal to the network, of transmission channels.

Further optionally, the first DMRS port corresponding to each group of data transmission ports is determined in a manner specified or configured in advance.

Illustratively, for the codebook based transmission, following Examples are provided.

Example 1: when the network configures that the terminal has at most one PTRS port, the port is associated with the DMRS port with the lowest/highest numbering value or the DMRS port determined according to other rules (i.e., the same precoding is adopted).

Example 2: when the network configures that the terminal has at most two PTRS ports, processing is performed according to following rules 1-2.

Rule 1: which ports can use the same PTRS port is determined according to a rule specified in advance.

Rule 2: if a port corresponding to the TPMI indicated by the network device can use the same PTRS port according to the above rule, one PTRS port is used; if the port corresponding to the TPMI indicated by the network needs to use more than one PTRS port according to the above rule, two PTRS ports are used. For example, if only one PTRS port is used, the PTRS port is associated with the DMRS port with the lowest/highest numbering value or the DMRS port determined according to another rule; if two PTRS port are used, that DMRS ports are grouped according to an indication for the TPMI, the DMRS ports capable of sharing one PTRS port are grouped into a group, each of the PTRS ports is associated with the DMRS port with the lowest/highest numbering value or the DMRS value determined according to another rule.

Optionally, the first indication information is used to indicate uplink transmission channels of the terminal are fully-coherent, and the data transmission ports are grouped into one group; or, the first indication information is used to indicate that the data transmission ports are grouped into two groups when the uplink transmission channels of the terminal are non-coherent or when the uplink transmission channels of the terminal are partially-coherent.

Optionally, the association relation between the PTRS port and the DMRS port is determined by the terminal according to the coherence information among the uplink transmission channels indicated by the first indication information.

Optionally, if the transmission mode is the non-codebook based transmission, then the second SRS resource indicated by the second indication information is used to determine the number of PTRS ports, and an association between a DMRS port and a PTRS port used by the terminal.

Optionally, the second SRS resources are a plurality of second SRS resources for non-codebook based transmission, and whether a PTRS port can be shared among the plurality of second SRS resources is predefined or configured by the network device.

For example, for a terminal with partial coherence, if the number of PTRS ports configured by the network is greater than 1, then following "1)" to "2)" are provided.

1) In case of codebook based transmission, the corresponding association relation is determined according to the indication of the TPMI.

Example 1: in the case of codebook based transmission, the corresponding association relation is determined according to the indication of TPMI. For example, if all antennas corresponding to transmission indicated by the TPMI are within one port air that is coherent, only one PTRS port is used, and the PTRS port is associated with the lowest DMRS port, in such a case, which ports belong to the port fair that is coherent is determined according to a rule specified in advance.

Example 2: if the transmission indicated by the TPMI corresponds to more than one port fair that are coherent, more than one PTRS port need to be used; only one PTRS port is used if ports corresponding to the transmission indicated by the TPMI are all within one port air that is coherent. For example, if only one PTRS port is used, the PTRS port is associated with the DRMS port with the lowest/highest numbering value or the DMRS port determined according to another rule, or if two PTRS ports are used, the DMRS ports are grouped according to the indication of the TPMI, the DMRS ports corresponding to one port pair that is coherent are taken as a group, the PTRS ports are associated with the DRMS port with the lowest/highest numbering value or the DMRS port determined according to another rule, in the groups, respectively.

2) In case of the non-codebook based transmission, whether different SRIs can share PTRS ports is determined according to rule specified/configured in advance, and thereafter the number of PTRS ports required is determined, see following examples.

Example 1: the maximum number of layers is 4, and a partially-coherent condition exists. In an SRS sent by the terminal, SRSs corresponding to SRI=1 and SRI=2 are specified to share one PTRS port; SRSs corresponding to SRI=3 and SRI=4 are specified to share the other PTRS port.

Example 2: the terminal determines, according to an SRI indication from the network, whether to use one or two PTRS ports. For example, uplink transmission triggered by the network is 2-layer transmission, corresponding two layers are SRI=1 and SRI=2, respectively, then only one PTRS port is used. If the uplink transmission triggered by the network is 2-layer transmission and corresponding two layers are SRI=1 and SRI=4, respectively, then two PTRS ports need to be used.

Example 3: the DMRS port with the lowest numbering value is associated within a corresponding combination. If the uplink transmission triggered by the network is 4-layer transmission and DMRS ports=1~4 correspond to SRIs=1~4, respectively, then two PTRS ports need to be used, the first PTRS port corresponds to a DMRS port 1, and the second PTRS port corresponds to a DMRS port 3.

In the embodiments of the present disclosure, capability information reported by a plurality of terminals are combined and corresponding capability information is determined through a plurality of implicit rules, and an SRS transmission mode corresponding to a User Equipment (UE) is determined by the implicit rules, an uplink transmission behavior of the UE is determined according to various types of instructions and implicit rules; a mapping rule between a PTRS port and a DMRS port is determined by the implicit rules and a preconfigured specification.

Figure 3:
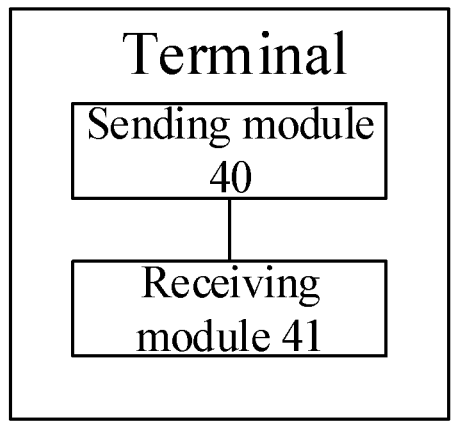
FIG. 3 is a schematic structural diagram of a terminal according to some embodiments of the present disclosure.

FIG. 3 is a schematic structural diagram of a terminal provided by some embodiments of the present disclosure. As shown in FIG. 3, the terminal includes a sending module 40 and a receiving module 41. The sending module 40 is used to send first indication information to a network device; wherein the first indication information is used to indicate, to the network device, at least one of following: the number of first uplink sounding signal (SRS) resource sets required by the terminal, the number of first SRS resources in each of the first SRS resource sets, the maximum number of layers of uplink multi-antenna transmission of the terminal, whether uplink transmission channels of the terminal are coherent, the maximum number of PTRS (Phase Tracking Reference Signal) ports supported for uplink transmission by the terminal. The first indication information is used by the network device to determine second indication information, the second indication information is used to instruct the terminal to send a Sounding Reference Signal (SRS) signal. The receiving module 41 is used to receive the second indication information sent by the network device; the sending module 40 is further used to send an SRS signal according to the second instruction information.

Optionally, the first indication information is further used by the network device to determine third indication information. The receiving module 41 is further used to receive the third indication information sent by the network device. The third indication information is used to indicate a transmission mode of uplink data sent by the terminal to the network device, and the transmission mode includes a codebook based transmission and non-codebook based transmission; the sending module is further used to send uplink data to the network device according to the transmission mode indicated by the third indication information.

Optionally, the first indication information includes at least one of following: the number of first SRS resource sets, the number of first SRS resources, the maximum number of layers, and coherence information among uplink transmission channels; wherein at least one of following: the number of first SRS resource sets, the number of first SRS resources, and the maximum number of layers is used to indicate whether the uplink transmission channels, are coherent.

Optionally, the first indication information is used to indicate that uplink transmission channels of the terminal are fully-coherent, wherein the first indication information is that the number of first SRS resource sets is 1 and the maximum number of layers is greater than 1; or, the first indication information is used to indicate that uplink transmission channels of the terminal are non-coherent, and the first indication information is that the number of the first SRS resource sets is the same as the maximum number of layers; or, the first indication information is used to indicate the uplink transmission channels of the terminal are partially-coherent, and the first indication information is that the number of the first SRS resource sets is greater than 1 and the maximum number of layers is greater than 1.

Optionally, the first indication information includes at least one of following: the number of first SRS resource sets, the number of first SRS resources, the maximum number of layers, coherence information among uplink transmission channels, and the maximum number of PTRS ports; wherein coherence information among uplink transmission channels is used to indicate the maximum number of PTRS ports; or the maximum number of layers and the number of first SRS resource sets are used to indicate the maximum number of PTRS ports; or the maximum number of PTRS ports is used to indicate whether the uplink transmission channels are coherent; or the maximum number of PTRS ports and the number of layers are used to indicate whether the uplink transmission channels are coherent.

Optionally, coherence information among uplink transmission channels is used to indicate the maximum number of PTRS ports; the first indication information is used to indicate that uplink transmission channels of the terminal are coherent, and the first indication information is that the maximum number of PTRS ports is 1; or, the first indication information is used to indicate that uplink transmission channels of the terminal are non-coherent, and the first indication information is that the maximum number of PTRS ports is the same as the maximum number of layers; or, the first indication information is used to indicate the uplink transmission channels of the terminal are partially-coherent, and the first indication information is that the maximum number of PTRS ports is the number of the first SRS resource set; or, the maximum number of layers and the number of first SRS resource sets are used to indicate the maximum number of PTRS ports, the first indication information is used to indicate that the number of first SRS resource sets is 1 and the maximum number of layers is greater than 1, and the first indication information is that the maximum number of PTRS ports is 1; or, the first indication information is used to indicate that the number of first SRS resource sets and the maximum number of layers are the same, and the first indication information is that the maximum number of PTRS ports is the same as the maximum number of layers; or, the first indication information is used to indicate that the number of first SRS resource sets is greater than 1 and the maximum number of layers is greater than the maximum number of PTRS ports, and the first indication information is that the maximum number of PTRS ports is the number of first SRS resource sets; or, the maximum number of PTRS ports is used to indicate whether the uplink transmission channels are coherent, the first indication information is used to indicate uplink transmission channels of the terminal are fully-coherent, and the first indication information is that the maximum number of PTRS ports is 1; or, the PTRS maximum number of PTRS ports is used to indicate whether the uplink transmission channels are coherent, the first indication information is used to indicate that uplink transmission channels of the terminal are non-coherent, the first indication information is that the maximum number of PTRS ports is the same as the maximum number of layers, and the maximum number of PTRS ports is greater than 1; or, the first indication information is used to indicate that the uplink transmission channels of the terminal are partially-coherent, the first indication information is that the maximum number of PTRS ports is greater than 1, and the maximum number of PTRS ports is less than the maximum number of layers.

Optionally, the first indication information is specifically used to indicate the number of analog beams required by one antenna panel of the terminal; wherein the number of analog beams is used to indicate the number of first SRS resource sets and the number of first SRS resources; or, the first indication information is specifically used to indicate the number of first SRS resource sets and the number of first SRS resources, the number of first SRS resource sets and the number of first SRS resources are used to indicate the number of analog beams.

Optionally, the first indication information is specifically used to indicate the number of analog beams required by one antenna panel of the terminal. The first indication information includes at least one of following: the total number of analog beams in all analog beam layers of the antenna panel, the number of analog beams required by each analog beam layer of the antenna panel, and the number of analog beams in a first analog beam layer of the antenna panel; wherein the first analog beam layer is an analog beam layer having the largest number of analog beams in all analog beam layers of the antenna panel.

Optionally, the second indication information is used to instruct the terminal to send the SRS signal according to the first predetermined rule.

Optionally, the first predetermined rule includes: sending the SRS signal using a second SRS resource configured by the network device, performing at least one of beam repetition and beam-scanning using an analog beam in the highest analog beam layer of the antenna panel, performing beam-training or beam-scanning on all beams, performing beam-scanning according to an analog beam in the lowest analog beam layer of the antenna panel, calculating a transmission power according to a granularity of a second SRS resource set, sending the SRS signal simultaneously on each second SRS resource in each second SRS resource set, and performing precoding on the SRS signal according to a precoding granularity indicated by the network device.

Optionally, the second indication information is further used to indicate at least one second SRS resource set. The first predetermined rule is to perform beam-repetition using an analog beam in the highest analog beam layer of the antenna panel, each second SRS resource set indicated by the second indication information includes one second SRS resource; the first predetermined rule is to perform beam-training or beam-scanning on all beams or perform beam-repetition using an analog beam in the highest analog beam layer of the antenna panel, or perform beam-scanning using an analog beam in the highest analog beam layer of the antenna panel, the second indication information indicates at least one second SRS resource set, and the number of second SRS resources indicated by the second indication information is the same as the number of the first SRS resources.

Optionally, the second indication information is used to instruct the terminal to identify the second SRS resource according to a first predetermined rule. The first predetermined rule includes: identifying the second SRS resource as an SRS resource for acquiring channel information for an uplink transmission channel in the codebook based transmission, identifying the second SRS resource as an SRS resource for acquiring channel information for an uplink transmission channel in non-codebook based transmission.

Optionally, the second indication information is used to indicate that the number of ports of the second SRS resources is greater than 1. The first predetermined rule is to identify the second SRS resource as the SRS resource for acquiring channel information of an uplink transmission channel in the codebook based transmission. The second indication information is used to indicate that the number of ports of the second SRS resources is 1, the first predetermined rule is to identify the second SRS resource as an SRS resource for acquiring channel information of an uplink transmission channel in the non-codebook based transmission.

Optionally, the second indication information is used to indicate that the number of ports of the second SRS resources is greater than 1, the first predetermined rule is to identify the second SRS resource as an SRS resource for acquiring channel information of an uplink transmission channel in the codebook based transmission. The second indication information is further used to indicate beam information of different ports in the second SRS resource, and the number of different beams indicated for all ports of one second SRS resource is the same as the number of the first SRS resource sets, and the first indication information is used to indicate the number of the first SRS resource sets; or, the second indication information is further used to indicate beam information of different ports in the second SRS resource, the number of different beams indicated for all ports of one second SRS resource is determined by information, in the first indication information, indicating whether the uplink transmission channels of the terminal are coherent; or, the second indication information is used to instruct the terminal to select, according to a predetermined port-numbering rule, ports of different antennas to send the SRS signal.

Optionally, the second indication information is further used to indicate the number of beams, and the first indication information is used to indicate whether the uplink transmission channels of the terminal are coherent; the first indication information is used to indicate that uplink transmission channels of the terminal are non-coherent, and the second indication information is specifically used to indicate that the number of beams is 1 to indicate one beam for each port; or, the first indication information is used to indicate uplink transmission channels of the terminal are partially coherent, and the second indication information is specifically used to indicate one beam for each port pair; or, the first indication information is used to indicate uplink transmission channels of the terminal are partially coherent, and the second indication information is specifically used to indicate one beam for each port pair; the port pair is pre-specified.

Optionally, the second indication information is used to indicate that the number of ports of the second SRS resource is 1, the first predetermined rule is to identify the second SRS resource as an SRS resource for acquiring channel information of an uplink transmission channel in a non-codebook based transmission mode; the second indication information is specifically used to indicate at least one second SRS resource set and a CSI-RS corresponding to each second SRS resource set, and the CSI-RS is specifically used to instruct the terminal to calculate a precoding vector for an SRS resource within the corresponding second SRS resource set, or the second indication information is specifically used to indicate a transmission beam corresponding to each second SRS resource, or, the SRS signal includes at least two first SRS signals, and the second indication information is used to indicate that the terminal sorts the at least two first SRS signals prior to transmitting the at least two first SRS signals subjected to precoding.

Optionally, the second SRS resources are precoded among the antennas that are coherent, or the second SRS resources are precoded among at least two antennas that are non-coherent.

Optionally, a rule of the sorting is a predefined rule, or a rule configured by the network device which includes sorting according to a condition of whether phases of ports are coherent.

Optionally, the third indication information is used to indicate a second SRS resource. The second SRS resource includes a resource for acquiring channel state information in codebook based transmission, and the transmission mode of the uplink data is codebook based transmission; or, the second SRS resource includes a resource for acquiring channel state information in non-codebook based transmission, and the transmission mode of the uplink data is the non-codebook based transmission; or, the second SRS resource does not include the resource for acquiring channel state information of a codebook transmission channel or the resource for acquiring channel state information of a non-codebook transmission channel, then the transmission mode of the uplink data is the non-codebook based transmission; or, the second SRS resource does not include the resource for acquiring channel state information of the codebook transmission channel or the resource for acquiring channel state information of the non-codebook transmission channel, then, the transmission mode of the uplink data is the codebook based transmission; or, the third indication information directly indicates whether the transmission mode of the uplink data is the codebook based transmission or the non-codebook based transmission.

Optionally, the second SRS resource is indicated by an identifier (ID) of the second SRS resource set and an index of a resource in the resource set.

Optionally, when the third indication information or the second SRS resource indicates the non-codebook based transmission, the terminal adopts the same transmission beam and transmission precoding mode as that for the second SRS resource.

Optionally, when the third indication information or the second SRS resource indicates the codebook based transmission, the terminal employs the same transmission beam as that for the second SRS resource.

Optionally, the third indication information is used to indicate an association relation between a PTRS port and a DMRS port of the terminal; wherein the association relation is used to indicate precoding or a resource location used by the terminal for transmission of a PTRS port.

Optionally, the transmission mode is codebook based transmission, and the third indication information is also used to indicate coding matrix information (Transmission Precoding Matrix Indicator (TPMI)) of the terminal and the maximum number of layers.

Optionally, the receiving module 41 is further used to receive fourth indication information sent by the network device.

Optionally, the fourth indication information is used to instruct the terminal to use one PTRS port; if the maximum number of PTRS ports indicated by the first indication information is 1 or the fourth indication information is used to instruct the terminal to use one PTRS port, and the maximum number of layers is less than or equal to 4, then the PTRS port is associated with a predefined DMRS port; or, if the maximum number of PTRS ports indicated by the first indication information is 1 or the fourth indication information is used to instruct the terminal to use one PTRS port, and the maximum number of layers is greater than 4, then the third indication information is used to indicate that the PTRS port is associated with a predefined DMRS port.

Optionally, the fourth indication information is used to indicate that the terminal uses two PTRS ports. If the maximum number of PTRS ports is 2 or the fourth indication information is used to instruct that the terminal uses two PTRS ports, and data transmission ports corresponding to the TPMI are in one of two groups of data transmission ports specified in advance, then the number of PTRS ports available for the DMRS port is equal to 1, and the PTRS port is associated with the DMRS port; or, if the maximum number of PTRS ports is 2 or the fourth indication information is used to indicate that the terminal uses two PTRS ports, the data transmission port corresponding to the TPMI is not in one of two groups of data transmission ports specified in advance, then the number of PTRS ports available for the DMRS port is greater than 1, the first DMRS port corresponding to each group of data transmission ports is associated with one PTRS port.

Optionally, a grouping rule for grouping the two groups of data transmission ports specified in advance is obtained according to a codebook; or, the grouping rule for grouping the two groups of data transmission ports specified in advance is obtained according to coherence information, reported by the terminal to the network, of transmission channels.

Optionally, the first indication information is used to indicate uplink transmission channels of the terminal are fully-coherent, and the data transmission ports are grouped into one group; or, the first indication information is used to indicate that the data transmission ports are grouped into two groups when the uplink transmission channels of the terminal are non-coherent or when the uplink transmission channels of the terminal are partially-coherent.

Optionally, the association relation between the PTRS port and the DMRS port is determined by the terminal according to the coherence information among the uplink transmission channels indicated by the first indication information.

Optionally, the first DMRS port corresponding to each group of data transmission ports is determined in a manner specified or configured in advance.

Optionally, if the transmission mode is the non-codebook based transmission, then the second SRS resource indicated by the second indication information is used to determine the number of PTRS ports, and an association between a DMRS port and a PTRS port used by the terminal.

Optionally, the second SRS resources are a plurality of second SRS resources for non-codebook based transmission, and whether a PTRS port can be shared among the plurality of second SRS resources is predefined or configured by the network device.

In the embodiments of the present disclosure, the terminal sends the first indication information to the network device. The first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, the maximum number of PTRS (Phase Tracking Reference Signal) ports supported for uplink transmission by the terminal, wherein the first indication information is used by the network device to determine second indication information, the second indication information is used to instruct the terminal to send an SRS signal. The terminal receives the second indication information sent by the network device, and sends the SRS signal according to the second indication information.

Figure 4:
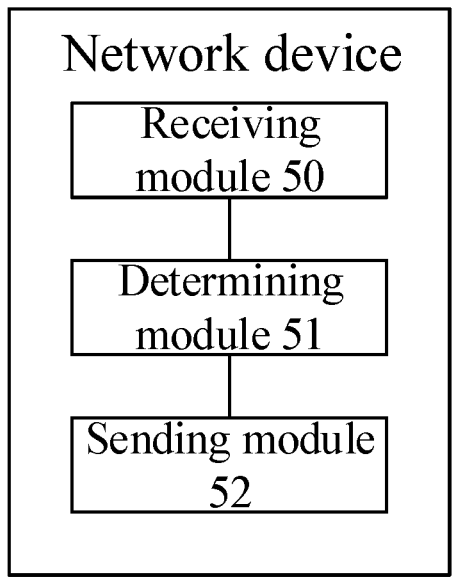
FIG. 4 is a schematic structural diagram of a network device according to some embodiments of the present disclosure.

As shown in FIG. 4, some embodiments of the present disclosure provides a network device. The network device includes a receiving module 50, a determining module 51, and a sending module 52. The receiving module 50 is used to receive first indication information sent by a terminal; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of PTRS (Phase Tracking Reference Signal) ports; the first indication information is used by the network device to determine second indication information, the second indication information is used to instruct the terminal to send an SRS signal. The determining module 51 is used to determine second indication information according to the first indication information. The sending module 52 is used to send the second indication information to the terminal. The receiving module 50 is further used to receive the SRS signal sent by the terminal.

Optionally, the first indication information is further used by the network device to determine third indication information. The determining module 51 is further used to determine third indication information according to the first indication information. The sending module 52 is further used to send the third indication information to the terminal. The third indication information is used to indicate a transmission mode of uplink data sent by the terminal to the network device, and the transmission mode includes a codebook based transmission and a non-codebook based transmission. The receiving module 50 is further used to receive the uplink data sent by the terminal according to the transmission mode indicated by the third indication information.

Optionally, the first indication information includes at least one of following: the number of first SRS resource sets, the number of first SRS resources, the maximum number of layers, and coherence information among uplink transmission channels; wherein at least one of following: the number of first SRS resource sets, the number of the first SRS resources, and the maximum number of layers is used to indicate whether the uplink transmission channels, are coherent.

Optionally, the first indication information is used to indicate that uplink transmission channels of the terminal are fully-coherent, the first indication information is that the number of first SRS resource sets is 1 and the maximum number of layers is greater than 1; or, the first indication information is used to indicate that uplink transmission channels of the terminal are non-coherent, and the first indication information is that the number of the first SRS resource sets is the same as the maximum number of layers; or, the first indication information is used to indicate the uplink transmission channels of the terminal are partially-coherent, and the first indication information is that the number of the first SRS resource sets is greater than 1 and the maximum number of layers is greater than 1.

Optionally, the first indication information includes at least one of following: the number of first SRS resource sets, the number of first SRS resources, the maximum number of layers, coherence information among uplink transmission channels, and the maximum number of PTRS ports; wherein the coherence information among the uplink transmission channels is used to indicate the maximum number of PTRS ports; or, the maximum number of layers and the number of first SRS resource sets are used to indicate the maximum number of PTRS ports; or, the maximum number of PTRS ports is used to indicate whether the uplink transmission channels are coherent; or, the maximum number of PTRS ports and the number of layers are used to indicate whether the uplink transmission channels are coherent.

Optionally, coherence information among uplink transmission channels is used to indicate the maximum number of PTRS ports; the first indication information is used to indicate uplink transmission channels of the terminal are fully-coherent, and the first indication information is that the maximum number of PTRS ports is 1; or, the first indication information is used to indicate that uplink transmission channels of the terminal are non-coherent, and the first indication information is that the maximum number of PTRS ports is the same as the maximum number of layers; or, the first indication information is used to indicate the uplink transmission channels of the terminal are partially-coherent, and the first indication information is that the maximum number of PTRS ports is the number of the first SRS resource sets;

or, the maximum number of layers and the number of first SRS resource sets are used to indicate the maximum number of PTRS ports; the first indication information is used to indicate that the number of the first SRS resource sets is 1 and the maximum number of layers is greater than 1, and the first indication information is that the maximum number of PTRS ports is 1; or, the first indication information is used to indicate that the number of the first SRS resource sets is the same as the maximum number of layers, and the first indication information is that the maximum number of PTRS ports is the same as the maximum number of layers; or, the first indication information is used to indicate that the number of the first SRS resource sets is greater than 1, and the maximum number of layers is greater than 1 and the maximum number of PTRS ports, and the first indication information is that the maximum number of PTRS ports is the number of the first SRS resource sets;

or, the maximum number of PTRS ports is used to indicate whether the uplink transmission channels are coherent; the first indication information is used to indicate uplink transmission channels of the terminal are fully-coherent, and the first indication information is that the maximum number of PTRS ports is 1;

or, the maximum number of PTRS ports is used to indicate whether the uplink transmission channels are coherent; the first indication information is used to indicate that uplink transmission channels of the terminal are non-coherent, and the first indication information is that the maximum number of PTRS ports is the same as the maximum number of layers, and, the maximum number of PTRS ports is great than 1; or, the first indication information is used to indicate the uplink transmission channels of the terminal are partially-coherent, the first indication information is that the maximum number of PTRS ports is greater than 1, and, the maximum number of PTRS ports is less than the maximum number of layers.

Optionally, the first indication information is specifically used to indicate the number of analog beams required by an antenna panel of the terminal, the number of analog beams is used to indicate the number of first SRS resource sets and the number of first SRS resources; or, the first indication information is specifically used to indicate the number of first SRS resource sets and the number of first SRS resources, and the number of first SRS resource sets and the number of first SRS resources are used to indicate the number of analog beams.

Optionally, the first indication information is specifically used to indicate the number of analog beams required by an antenna panel of the terminal, and the first indication information includes at least one of: the total number of analog beams in all analog beam layers of the antenna panel, the number of analog beams required by each analog beam layer of the antenna panel, and the number of analog beams in a first analog beam layer of the antenna panel. The first analog beam layer is an analog beam layer having the largest number of analog beams in all analog beam layers of the antenna panel.

Optionally, the second indication information is used to instruct the terminal to send the SRS signal according to a first predetermined rule.

Optionally, the first predetermined rule includes: sending the SRS signal using a second SRS resource configured by the network device, performing at least one of beam repetition and beam-scanning using an analog beam in the highest analog beam layer of the antenna panel, performing beam-training or beam-scanning on all beams, performing beam-scanning according to an analog beam in the lowest analog beam layer of the antenna panel, calculating a transmission power according to a granularity of a second SRS resource set, sending the SRS signal simultaneously on each second SRS resource in each second SRS resource set, and performing precoding on the SRS signal according to a precoding granularity indicated by the network device.

Optionally, the second indication information is further used to indicate at least one second SRS resource set. The first predetermined rule is to perform beam-repetition using an analog beam in the highest analog beam layer of the antenna panel, each second SRS resource set indicated by the second indication information includes a second SRS resource. The first predetermined rule is to perform beam-training or beam-scanning on all beams or perform beam-repetition using an analog beam in the highest analog beam layer of the antenna panel, or perform beam-scanning using an analog beam in the highest analog beam layer of the antenna panel, the second indication information indicates at least one second SRS resource set, and the number of second SRS resources indicated by the second indication information is the same as the number of the first SRS resources.

Optionally, the second indication information is used to instruct the terminal to identify the second SRS resource according to a first predetermined rule; the first predetermined rule includes: identifying the second SRS resource as an SRS resource for acquiring channel information for an uplink transmission channel in the codebook based transmission, identifying the second SRS resource as an SRS resource for acquiring channel information for an uplink transmission channel in non-codebook based transmission.

Optionally, the second indication information is used to indicate that the number of ports of the second SRS resource is greater than 1, the first predetermined rule is to identify the second SRS resource as the SRS resource for acquiring channel information for an uplink transmission channel in the codebook based transmission. The second indication information is used to indicate that the number of ports of the second SRS resource is 1, the first predetermined rule is to identify the second SRS resource as an SRS resource for acquiring channel information of an uplink transmission channel in the non-codebook based transmission.

The second indication information is used to indicate that the number of ports of the second SRS resource is greater than 1, the first predetermined rule is to identify the second SRS resource as an SRS resource for acquiring channel information of an uplink transmission channel in the codebook based transmission; wherein, the second indication information is further used to indicate beam information of different ports in the second SRS resource, and the number of different beams indicated for all ports of a second SRS resource is the same as the number of the first SRS resource sets, and the first indication information is used to indicate the number of the first SRS resource sets; or, the second indication information is further used to indicate beam information of different ports in the second SRS resource, the number of different beams indicated for all ports of a second SRS resource is determined by information, in the first indication information, indicating whether the uplink transmission channels of the terminal are coherent; or, the second indication information is used to instruct the terminal to select, according to a predetermined port-numbering rule, ports of different antennas to send the SRS signal.

Optionally, the second indication information is also used to indicate the number of beams, the first indication information is used to indicate whether uplink transmission channels of the terminal are coherent. The first indication information is used to indicate that uplink transmission channels of the terminal are non-coherent, and the second indication information is specifically used to indicate that the number of beams is 1 to indicate one beam for each port; or, the first indication information is used to indicate phases of uplink transmission channels of the terminal are partially coherent, and the second indication information is specifically used to indicate a beam for each port pair; or, the first indication information is used to indicate phases of uplink transmission channels of the terminal are partially coherent, and the second indication information is specifically used to indicate a beam for each port pair; the above port pair is pre-specified.

Optionally, the second indication information is used to indicate that the number of ports of the second SRS resource is 1, the first predetermined rule is to identify the second SRS resource as an SRS resource for acquiring channel information of an uplink transmission channel in a non-codebook based transmission mode; the second indication information is specifically used to indicate at least one second SRS resource set and a CSI-RS corresponding to each second SRS resource set, and the CSI-RS is specifically used to instruct the terminal to calculate a precoding vector for an SRS resource within the corresponding second SRS resource set, or the second indication information is specifically used to indicate a transmission beam corresponding to each second SRS resource, or, the SRS signal includes at least two first SRS signals, and the second indication information is used to indicate that the terminal sorts the at least two first SRS signals prior to sending the at least two first SRS signals subjected to precoding.

Optionally, the second SRS resources are precoded among the antennas that are coherent, or the second SRS resources are precoded among at least two antennas that are non-coherent.

Optionally, a rule of the sorting is a predefined rule, or a rule configured by the network device which includes sorting according to a condition of whether phases of ports are coherent.

Optionally, the third indication information is used to indicate the second SRS resource. The second SRS resource includes a resource for acquiring channel state information in codebook based transmission, and the transmission mode of the uplink data is codebook based transmission; or, the second SRS resource includes a resource for acquiring channel state information in non-codebook based transmission, and the transmission mode of the uplink data is the non-codebook based transmission; or, the second SRS resource does not include the resource for acquiring channel state information of a codebook transmission channel or the resource for acquiring channel state information of a non-codebook transmission channel, then the transmission mode of the uplink data is the non-codebook based transmission; or, the second SRS resource does not include the resource for acquiring channel state information of the codebook transmission channel or the resource for acquiring channel state information of the non-codebook transmission channel, then, the transmission mode of the uplink data is the codebook based transmission; or, the third indication information directly indicates whether the transmission mode of the uplink data is the codebook based transmission or the non-codebook based transmission.

Optionally, the second SRS resource is indicated by an identifier (ID) of the second SRS resource set and an index of a resource in the resource set.

Optionally, when the third indication information or the second SRS resource indicates the non-codebook based transmission, the terminal adopts the same transmission beam and transmission precoding mode as that for the second SRS resource.

Optionally, when the third indication information or the second SRS resource indicates the codebook based transmission, the terminal employs the same transmission beam as that for the second SRS resource.

Optionally, the third indication information is used to indicate an association relation between a PTRS port and a DMRS port of the terminal; wherein the association relation is used to indicate precoding or a resource location used by the terminal for transmission of a PTRS port.

Optionally, the transmission mode is codebook based transmission, and the third indication information is also used to indicate coding matrix information (Transmission Precoding Matrix Indicator (TPMI)) of the terminal and the maximum number of layers.

Optionally, the sending module 52 is further used to send the fourth indication information to the terminal.

Optionally, the fourth indication information is used to instruct the terminal to use one PTRS port. If the maximum number of PTRS ports indicated by the first indication information is 1 or the fourth indication information is used to instruct the terminal to use one PTRS port, and the maximum number of layers is less than or equal to 4, then the PTRS port is associated with a predefined DMRS port; or, if the maximum number of PTRS ports indicated by the first indication information is 1 or the fourth indication information is used to instruct the terminal to use one PTRS port, and the maximum number of layers is greater than 4, then the third indication information is used to indicate that the PTRS port is associated with a predefined DMRS port.

Optionally, the fourth indication information is used to indicate that the terminal uses two PTRS ports. If the maximum number of PTRS ports is 2 or the fourth indication information is used to instruct that the terminal uses two PTRS ports, and data transmission ports corresponding to the TPMI are in one of two groups of data transmission ports specified in advance, then the number of PTRS ports available for the DMRS port is equal to 1, and the PTRS port is associated with the DMRS port; or, the maximum number of PTRS ports is 2 or the fourth indication information is used to indicate that the terminal uses two PTRS ports, the data transmission port corresponding to the TPMI is not in one of two groups of data transmission ports specified in advance, and the number of PTRS ports available for the DMRS port is greater than 1, the first DMRS port corresponding to each group of data transmission ports is associated with one PTRS port.

Optionally, a grouping rule for grouping the two groups of data transmission ports specified in advance is obtained according to a codebook; or, the grouping rule for grouping the two groups of data transmission ports specified in advance is obtained according to coherence information, reported by the terminal to the network, of transmission channels.

Optionally, the first indication information is used to indicate uplink transmission channels of the terminal are fully-coherent, and the data transmission ports are grouped into one group; or, the first indication information is used to indicate that the data transmission ports are grouped into two groups when the uplink transmission channels of the terminal are non-coherent or when the uplink transmission channels of the terminal are partially-coherent.

Optionally, the association relation between the PTRS port and the DMRS port is determined by the terminal according to the coherence information among the uplink transmission channels indicated by the first indication information.

Optionally, the first DMRS port corresponding to each group of data transmission ports is determined in a manner specified or configured in advance.

Optionally, if the transmission mode is the non-codebook based transmission, then the second SRS resource indicated by the second indication information is used to determine the number of PTRS ports, and an association between a DMRS port and a PTRS port used by the terminal.

Optionally, the second SRS resources are a plurality of second SRS resources for non-codebook based transmission, and whether a PTRS port can be shared among the plurality of second SRS resources is predefined or configured by the network device.

The terminal provided by some embodiments of the present disclosure can realize various processes implemented by the terminal in the above method embodiments, and will not be described here in detail in order to avoid repetition.

In the embodiments of the present disclosure, the terminal sends the first indication information to the network device. The first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, the maximum number of PTRS (Phase Tracking Reference Signal) ports supported for uplink transmission by the terminal, wherein the first indication information is used by the network device to determine second indication information, the second indication information is used to instruct the terminal to send an SRS signal. The terminal receives the second indication information sent by the network device, and sends the SRS signal according to the second indication information.

Figure 5:
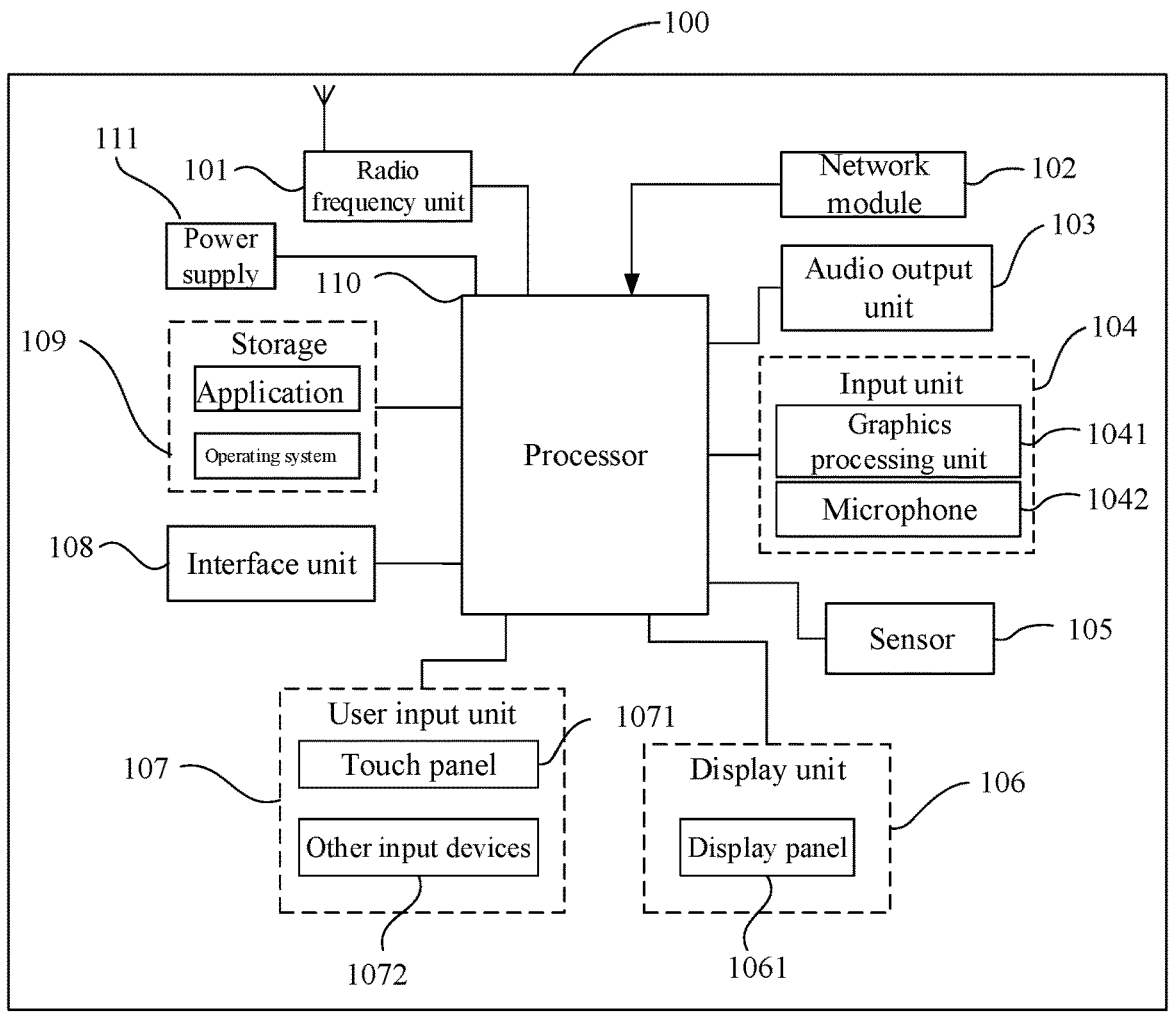
FIG. 5 is a schematic diagram of a hardware structure of a terminal according to some embodiments of the present disclosure.

FIG. 5 is a diagram of a hardware structure of a terminal for implementing various embodiments of the present disclosure, and the terminal 100 includes, but is not limited to, a radio-frequency (RF) unit 101, a network module 102, an audio output unit 103, an input unit 104, a sensor 105, a display unit 106, a user input unit 107, an interface unit 108, a storage 109, a processor 110, and a power supply 111. Those skilled in the art will appreciate that the structure of the terminal shown in FIG. 5 does not constitute a limitation to the terminal, but the terminal may include more or fewer components than illustrated, or combine certain components, or different component arrangements. In some embodiments of the present disclosure, the terminal includes, but is not limited to, a mobile phone, a tablet computer, a notebook computer, a palmtop computer, an in-vehicle terminal, a wearable device, and a pedometer.

The radio-frequency unit 101 is used to send first indication information to a network device. The first indication information is used to indicate at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, the maximum number of PTRS (Phase Tracking Reference Signal) ports outputted by the terminal in uplink; the first indication information is used by the network device to determine second indication information, the second indication information is used to instruct the terminal to send an SRS signal. The radio-frequency unit 101 is used to receive second indication information sent by the network device; the radio-frequency unit 101 is further used to send an SRS signal according to the second indication information.

It should be understood that, in some embodiments of the present disclosure, the radio-frequency unit 101 can be used for receiving and sending signals in a process of sending and receiving information or communicating, specifically, receiving downlink data from a base station and delivering the received downlink data to the processor 110 for processing; in addition, uplink data is delivered to the base station. Generally, the radio-frequency unit 101 includes, but is not limited to, an antenna, at least one amplifier, a transceiver, a coupler, a low noise amplifier, a duplexer, and the like. In addition, the radio-frequency unit 101 may also communicate with a network and other devices through a wireless communication system.

The terminal provides a user with wireless broadband Internet access through the network module 102, such as helping the user to send and receive emails, surfing web pages, accessing streaming media, and the like.

The audio output unit 103 may convert audio data received by the radio-frequency unit 101 or the network module 102 or stored in the storage 109 into an audio signal and output the same as sound. The audio output unit 103 may also provide audio output (e.g., a call signal reception sound, a message reception sound, etc.) related to a specific function performed by the terminal 100. The audio output unit 103 includes a speaker, a buzzer, a receiver, and the like.

The input unit 104 is used for receiving audio or video signals. The input unit 104 may include a Graphics Processing Unit (GPU) 1041 and a microphone 1042. The graphics processor 1041 processes image data of a still picture or video captured by an image capturing device (such as a camera) in a video capturing mode or an image capturing mode. The processed image frame may be displayed on the display unit 106. The image frames processed by the graphics processor 1041 may be stored in the storage 109 (or other storage medium) or transmitted via the radio-frequency unit 101 or the network module 102. The microphone 1042 can receive sound and can process such sound into audio data. The processed audio data may be converted into a format output that may be transmitted to a mobile communication base station via the radio-frequency unit 101 in a case of a telephone call mode.

The terminal 100 also includes at least one sensor 105, such as a light sensor, a motion sensor, and other sensors. In particular, that light sensor include an ambient light sensor and a proximity sensor, wherein the ambient light sensor can adjust the brightness of the display panel 1061 according to intensity of ambient light, and the proximity sensor can turn off a display panel 1061 and/or a backlight when the terminal 100 is moved to be close to the ear. As a type of motion sensor, an accelerometer sensor can detect a magnitude of acceleration in various directions (generally three axes), and can detect a magnitude and a direction of gravity when the accelerometer is stationary, and can be used to recognize a posture (such as vertical-horizontal screen switching, a related game, a magnetometer attitude calibration) of the terminal, vibration recognition related functions (such as a pedometer, a tapping, etc.). The sensor 105 may further include a fingerprint sensor, a pressure sensor, an iris sensor, a molecular sensor, a gyroscope, a barometer, a hygrometer, a thermometer, an infrared sensor, and the like, which will not be described herein.

The display unit 106 is used to display information inputted by the user or information provided to the user. The display unit 106 may include a display panel 1061, and a Liquid Crystal Display (LCD), an Organic Light-Emitting Diode (OLED) or the like may be adopted to configure the display panel 1061.

The user input unit 107 may be used to receive inputted digital or character information and generate a key signal input related to a user setting and a function control of the terminal. Specifically, the user input unit 107 includes a touch panel 1071 and other input devices 1072. The touch panel 1071, also referred to as a touch screen, may collect touch operations (e.g., an operation of the user on or near the touch panel 1071 using any suitable object or accessory such as a stylus or a finger) of the user on or near the touch panel. The touch panel 1071 may include a touch detection device and a touch controller. The touch detection device detects a touch orientation of the user, detects a signal caused by the touch operation, and transmits the signal to the touch controller; the touch controller receives touch information from the touch detection device, converts it into contact coordinates, and sends the touch information to the processor 110, receives a command from the processor 110, and executes it. Further, the touch panel 1071 may be realized in various types such as a resistance type, a capacitance type, an infrared ray type, and a surface acoustic wave type, and the like. The user input unit 107 may include other input devices 1072 in addition to the touch panel 1071. Specifically, the other input devices 1072 may include, but are not limited to, a physical keyboard, function keys (such as volume control keys, switch keys, etc.), a trackball, a mouse, and a joystick, which will not be described herein.

Further, the touch panel 1071 may be overlaid on the display panel 1061, and after the touch panel 1071 detects a touch operation on or near the touch panel 1071, the touch panel 1071 transmits information of the touch operation to the processor 110 to determine the type of touch event, the processor 110 then provides a corresponding visual output on the display panel 1061 according to the type of touch event. Although in FIG. 5, the touch panel 1071 and the display panel 1061 are two separate components to implement input and output functions of the terminal, the input and output functions of the terminal may be realized by integrating the touch panel 1071 and the display panel 1061 in some embodiments, and are not limited herein.

The interface unit 108 is an interface for connecting the terminal 100 to an external device. For example, the external device may include a wired or wireless headset port, an external power supply (or battery charger) port, a wired or wireless data port, a memory card port, a port for connecting a device having an identification module, an audio input/output (I/O) port, a video I/O port, a headphone port, and so on. The interface unit 108 may be used to receive input (e.g., data information, power or the like) from an external device and transmits the received input to one or more elements within the terminal 100, or may be used to transmit data between the terminal 100 and an external device.

The storage 109 may be used to store software programs as well as various data. The storage 109 may mainly include a storage program area and a storage data area, wherein the storage program area may store an operating system, an application program required for at least one function, such as a sound playing function, an image playing function, and the like; the storage data area may store data (such as audio data, a phonebook, etc.) created according to use of a mobile phone. In addition, the storage 109 may include a high speed random access memory, and may also include a non-volatile storage, such as at least one disk storage device, a flash memory device, or other volatile solid-state storage devices.

The processor 110 is a control center of the terminal, connects various parts of the entirety of the terminal using various interfaces and lines, executes various functions and processes data of the terminal by running or executing software programs and/or modules stored in the storage 109 and calling the data stored in the storage 109, thereby integrally monitoring the terminal. The processor 110 may include one or more processing units; optionally, the processor 110 may integrate an application processor and a modem processor. The application processor mainly processes an operating system, a user interface, an application program, etc., and the modem processor mainly processes wireless communication. It will be appreciated that the above-described modem processor may also not be integrated into the processor 110.

The terminal 100 may also include a power supply 111 (such as a battery) that supplies power to various components; optionally, the power supply 111 may be logically connected to the processor 110 through a power management system so that functions such as charging, discharging and power consumption management may be achieved through the power management system.

In addition, the mobile terminal 100 includes some functional modules not shown, which will not be described here.

Optionally, the embodiments of the present disclosure provide a terminal. The terminal includes a processor, a storage, and a computer program stored on the storage and executed by the processor, wherein when the steps are performed by the processor, the processor implements the steps of the signal transmission method performed by the terminal in the method embodiments described above.

Figure 6:
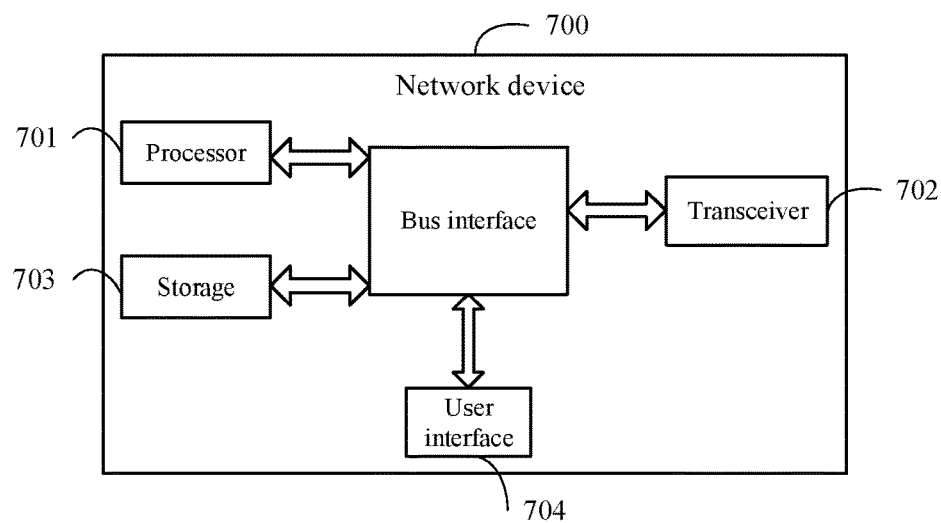
FIG. 6 is a schematic diagram of a hardware structure of a network device according to some embodiments of the present disclosure.

FIG. 6 is a diagram of a hardware structure of a network device for implementing various embodiments of the present disclosure, and the network device 700 includes a processor 701, a transceiver 702, a storage 703, a user interface 704, and a bus interface.

The transceiver 702 is used to receive first indication information sent by the terminal. The first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, the maximum number of PTRS (Phase Tracking Reference Signal) ports supported for uplink transmission by the terminal. The first indication information is used by the network device to determine second indication information, the second indication information is used to instruct the terminal to send an SRS signal. The processor 701 is used to determine the second indication information according to the first indication information; the transceiver 702 is used to transmit the second indication information to the terminal; the transceiver 702 is further used to receive an SRS signal transmitted by the terminal.

In some embodiments of the present disclosure, in FIG. 6, a bus architecture may include any number of interconnected bus and bridges, specifically various circuitry including one or more processors represented by the processor 701 and a storage represented by the storage 703 are linked together by the bus architecture. The bus architecture may also link together various other circuits, such as peripheral devices, regulators, and power management circuits, which are well known in the art, and thus will not be described further herein. A bus interface provides an interface. The transceiver 702 may be a plurality of elements, i.e., including a transmitter and a receiver, for providing units for communicating with various other devices over a transmission medium. For different user devices, a user interface 704 may also be an interface capable of externally or internally interfacing with a desired device including, but not limited to, a keypad, a display, a speaker, a microphone, a joystick, or the like. The processor 701 is responsible for managing a bus architecture and general processing, and the storage 703 may store data used by the processor 701 in performing operations.

In addition, the network device 700 also includes some functional modules not shown, which will not be described here.

Optionally, the embodiments of the present disclosure provide a network device. The network device includes a processor, a storage, and a computer program stored on the storage and executable by the processor, wherein when the computer program is executed by the processor, the processor implements the steps in the signal transmission method performed by the network device in the above method embodiments.

Optionally, the embodiments of the present disclosure provide a computer readable storage medium. The computer readable storage medium is characterized in that, a computer program is stored on the computer readable storage medium, processes in the signal transmission method in the method embodiments described above are implemented when the computer program is executed by a processor, the same technical effect can be achieved. In order to avoid duplication, the processes will not be repeated. The computer readable storage medium is, for example, a Read-Only Memory (ROM), a Random Access Memory (RAM), a magnetic disk or an optical disk, etc.

It should be noted that such terms as "include", "comprise", or any other variation thereof are intended to encompass a non-exclusive inclusion such that processes, methods, articles, or devices including a series of elements include not only those elements, but also include other elements that are not explicitly listed, or include elements inherent to such processes, methods, articles, or devices. In the absence of further limitations, an element defined by a statement "including one" is not excluded from coexistence with another identical element in a process, a method, an article, or a device that includes the element.

From the above description of the embodiments, those skilled in the art may clearly grasp that methods in the above embodiments may be implemented by means of software plus a necessary hardware platform, and of course may also be implemented by hardware. However, in many cases the former is a better implementation. Based on this understanding, an essential part, or a part contributing the prior art, of technical solutions of the present disclosure can be embodied in the form of a software product stored in a storage medium such as a ROM/RAM, a magnetic disk, an optical disc, or the like. Several instructions are included in the storage medium to cause a terminal (which may be a mobile phone, a computer, a server, an air-conditioner, or a network device, etc.) to perform the methods of various embodiments of the present disclosure.

The embodiments of the present disclosure have been described above in conjunction with the accompanying drawings, but the present disclosure is not limited to specific embodiments described above which are merely illustrative and not limiting. A person of ordinary skills in the art may, under teachings of the present disclosure, make many forms within the protection scope of the present disclosure without departing from the spirit of the present disclosure and the protection scope of the claims.

What is claimed is:

1. A terminal, comprising:
a processor, a storage, and a computer program stored on the storage and executable by the processor,
wherein when the computer program is executed by the processor, the processor implements a signal transmission method, the method comprises:
sending first indication information to a network device; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal;
receiving the second indication information sent by the network device;
sending the SRS signal according to the second indication information.

2. The terminal according to claim 1, wherein, the first indication information is further used by the network device to determine third indication information,
when the computer program is executed by the processor, the processor further implements:
receiving the third indication information sent by the network device, wherein the third indication information is used to indicate a transmission mode of uplink data sent by the terminal to the network device, the transmission mode comprises codebook based transmission and non-codebook based transmission;
sending the uplink data to the network device, according to the transmission mode indicated by the third indication information.

3. The terminal according to claim 1, wherein, the second indication information is used to instruct the terminal to send the SRS signal according to a first predetermined rule,
the second indication information is used to instruct the terminal to identify a second SRS resource according to a first predetermined rule;
the first predetermined rule comprises: identifying the second SRS resource as an SRS resource for acquiring channel information for an uplink transmission channel in the codebook based transmission, or identifying the second SRS resource as an SRS resource for acquiring channel information for an uplink transmission channel in non-codebook based transmission.

4. The terminal according to claim 2, wherein, the transmission mode is codebook based transmission, the third indication information is further used to indicate Transmission Precoding Matrix Indicator (TPMI) of the terminal and the maximum number of layers.

5. The terminal according to claim 4, wherein, when the computer program is executed by the processor, the processor further implements:
receiving fourth indication information sent by the network device;
the fourth indication information is used to instruct the terminal to use one PTRS port;
if the maximum number of PTRS ports indicated by the first indication information is 1 or the fourth indication information is used to instruct the terminal to use one PTRS port, and the maximum number of layers is less than or equal to 4, then the PTRS port is associated with a predefined DMRS port; or,
if the maximum number of PTRS ports indicated by the first indication information is 1 or the fourth indication information is used to instruct the terminal to use one PTRS port, and the maximum number of layers is greater than 4, then the third indication information is used to indicate that the PTRS port is associated with a predefined DMRS port.

6. The terminal according to claim 5, wherein, the fourth indication information is used to instruct the terminal to use two PTRS ports;
if the maximum number of PTRS ports is 2 or the fourth indication information is used to instruct the terminal to use two PTRS ports, and data transmission ports corresponding to the TPMI are in one of two groups of data transmission ports specified in advance, then the number of PTRS ports available for the DMRS port is equal to 1, and the PTRS port is associated with the DMRS port;
or,
if the maximum number of PTRS ports is 2 or the fourth indication information is used to instruct the terminal to use two PTRS ports, the data transmission port corresponding to the TPMI is not in one of two groups of data transmission ports specified in advance, then the number of PTRS ports available for the DMRS port is greater than 1, and a first DMRS port corresponding to each group of data transmission ports is associated with one PTRS port.

7. The terminal according to claim 6, wherein, a grouping rule for grouping the two groups of data transmission ports specified in advance is obtained according to a codebook; or, the grouping rule for grouping the two groups of data transmission ports specified in advance is obtained according to coherence information, reported by the terminal to a network, of transmission channels.

8. The terminal according to claim 2, wherein, if the transmission mode is the non-codebook based transmission, then the second SRS resource indicated by the second indication information is used to determine the number of PTRS ports, and an association between a DMRS port and a PTRS port used by the terminal.

9. A non-transitory computer readable storage medium, wherein, a computer program is stored on the computer readable storage medium, and when the computer program is executed by a processor, the processor implements a signal transmission method, the method comprises:
   sending, by a terminal, first indication information to a network device; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal;
   receiving, by the terminal, the second indication information sent by the network device;
   sending the SRS signal by the terminal, according to the second indication information.

10. The non-transitory computer readable storage medium according to claim 9, wherein, the first indication information is further used by the network device to determine third indication information,
   when the computer program is executed by the processor, the processor further implements:
   receiving, by the terminal, the third indication information sent by the network device, wherein the third indication information is used to indicate a transmission mode of uplink data sent by the terminal to the network device, the transmission mode comprises codebook based transmission and non-codebook based transmission;
   sending, by the terminal, the uplink data to the network device, according to the transmission mode indicated by the third indication information.

11. The non-transitory computer readable storage medium according to claim 9, wherein, the second indication information is used to instruct the terminal to send the SRS signal according to a first predetermined rule,
   the second indication information is used to instruct the terminal to identify a second SRS resource according to a first predetermined rule;
   the first predetermined rule comprises: identifying the second SRS resource as an SRS resource for acquiring channel information for an uplink transmission channel in the codebook based transmission, or identifying the second SRS resource as an SRS resource for acquiring channel information for an uplink transmission channel in non-codebook based transmission.

12. The non-transitory computer readable storage medium according to claim 10, wherein, the transmission mode is codebook based transmission, the third indication information is further used to indicate Transmission Precoding Matrix Indicator (TPMI) of the terminal and the maximum number of layers.

13. The non-transitory computer readable storage medium according to claim 12, wherein, when the computer program is executed by the processor, the processor further implements:
   receiving, by the terminal, fourth indication information sent by the network device;
   the fourth indication information is used to instruct the terminal to use one PTRS port;
   if the maximum number of PTRS ports indicated by the first indication information is 1 or the fourth indication information is used to instruct the terminal to use one PTRS port, and the maximum number of layers is less than or equal to 4, then the PTRS port is associated with a predefined DMRS port; or,
   if the maximum number of PTRS ports indicated by the first indication information is 1 or the fourth indication information is used to instruct the terminal to use one PTRS port, and the maximum number of layers is greater than 4, then the third indication information is used to indicate that the PTRS port is associated with a predefined DMRS port.

14. The non-transitory computer readable storage medium according to claim 13, wherein, the fourth indication information is used to instruct the terminal to use two PTRS ports;
   if the maximum number of PTRS ports is 2 or the fourth indication information is used to instruct the terminal to use two PTRS ports, and data transmission ports corresponding to the TPMI are in one of two groups of data transmission ports specified in advance, then the number of PTRS ports available for the DMRS port is equal to 1, and the PTRS port is associated with the DMRS port;
   or,
   if the maximum number of PTRS ports is 2 or the fourth indication information is used to instruct the terminal to use two PTRS ports, the data transmission port corresponding to the TPMI is not in one of two groups of data transmission ports specified in advance, then the number of PTRS ports available for the DMRS port is greater than 1, and a first DMRS port corresponding to each group of data transmission ports is associated with one PTRS port.

15. The non-transitory computer readable storage medium according to claim 14, wherein, a grouping rule for grouping the two groups of data transmission ports specified in advance is obtained according to a codebook; or,
   the grouping rule for grouping the two groups of data transmission ports specified in advance is obtained according to coherence information, reported by the terminal to a network, of transmission channels.

16. The non-transitory computer readable storage medium according to claim 10, wherein, if the transmission mode is the non-codebook based transmission, then the second SRS resource indicated by the second indication information is used to determine the number of PTRS ports, and an association between a DMRS port and a PTRS port used by the terminal.

17. A non-transitory computer readable storage medium, wherein, a computer program is stored on the computer readable storage medium, and when the computer program is executed by a processor, the processor implements a signal transmission method, the method comprises:

receiving, by a network device, first indication information sent by a terminal; wherein the first indication information is used to indicate, to the network device, at least one of following: the number of first Sounding Reference Signal (SRS) resource sets required by the terminal, the number of first SRS resources in each of the first SRS resource sets, the maximum number of layers of uplink multi-antenna transmission of the terminal, whether uplink transmission channels of the terminal are coherent, and the maximum number of Phase Tracking Reference Signal (PTRS) ports supported for uplink transmission by the terminal, wherein the first indication information is used by the network device to determine second indication information, the second indication information is used to instruct the terminal to send an SRS signal;

determining the second indication information by the network device according to the first indication information;

sending the second indication information to the terminal by the network device;

receiving, by the network device, the SRS signal sent by the terminal.

18. The non-transitory computer readable storage medium according to claim 17, wherein, the first indication information is further used by the network device to determine third indication information, when the computer program is executed by a processor, the processor further implements:

determining the third indication information by the network device according to the first indication information;

sending the third indication information to the terminal by the network device; wherein the third indication information is used to indicate a transmission mode of uplink data sent by the terminal to the network device, the transmission mode comprises codebook based transmission and non-codebook based transmission;

receiving, by the network device, the uplink data sent by the terminal according to the transmission mode indicated by the third indication information.

19. The non-transitory computer readable storage medium according to claim 17, wherein, the second indication information is used to instruct the terminal to send the SRS signal according to a first predetermined rule;

the second indication information is used to instruct the terminal to identify a second SRS resource according to a first predetermined rule;

the first predetermined rule comprises: identifying the second SRS resource as an SRS resource for acquiring channel information for an uplink transmission channel in the codebook based transmission, or identifying the second SRS resource as an SRS resource for acquiring channel information for an uplink transmission channel in non-codebook based transmission.

20. The non-transitory computer readable storage medium according to claim 18, wherein, if the transmission mode is the non-codebook based transmission, then the second SRS resource indicated by the second indication information is used to determine the number of PTRS ports, and an association between a DMRS port and a PTRS port used by the terminal.

* * * * *